US009497979B2

(12) United States Patent
Elejalde et al.

(10) Patent No.: US 9,497,979 B2
(45) Date of Patent: Nov. 22, 2016

(54) MULTI-REGION CHEWING GUM COMPOSITION INCLUDING ISOMALT GUM REGION

(71) Applicant: Intercontinental Great Brands LLC, East Hanover, NJ (US)

(72) Inventors: Cesar C. Elejalde, Randolph, NJ (US); William Hirt, New York, NY (US); Jesse Kiefer, Oxford, NJ (US); Craig Massey, Lake Hiawatha, NJ (US); Valentina Visci, West New York, NJ (US)

(73) Assignee: Intercontinental Great Brands LLC, East Hanover, NJ (US)

( * ) Notice: Subject to any disclaimer, the term of this patent is extended or adjusted under 35 U.S.C. 154(b) by 2 days.

(21) Appl. No.: 14/222,055

(22) Filed: Mar. 21, 2014

(65) Prior Publication Data

US 2014/0205715 A1    Jul. 24, 2014

Related U.S. Application Data

(63) Continuation of application No. 11/829,232, filed on Jul. 27, 2007, now abandoned, which is a
(Continued)

(51) Int. Cl.
*A23G 4/06* (2006.01)
*A23G 4/20* (2006.01)
*A23G 4/10* (2006.01)

(52) U.S. Cl.
CPC . *A23G 4/06* (2013.01); *A23G 4/10* (2013.01); *A23G 4/20* (2013.01)

(58) Field of Classification Search
USPC .............................................................. 426/3
See application file for complete search history.

(56) References Cited

U.S. PATENT DOCUMENTS

| 4,250,196 A | * | 2/1981 | Friello ............................. 426/5 |
| 5,478,593 A | * | 12/1995 | Serpelloni et al. .......... 427/2.14 |
| 5,547,689 A | * | 8/1996 | Ribadeau-Dumas et al. ............................... 426/3 |

FOREIGN PATENT DOCUMENTS

EP    1151673 A2 * 11/2001

OTHER PUBLICATIONS

McIntyre Isomalt as an international Sugar Replacer Food Ingredients and Analysis International vol. 23, 2001, No. 6, pp. 35-36.*
(Continued)

*Primary Examiner* — Kelly Bekker
(74) *Attorney, Agent, or Firm* — Hoffmann & Baron, LLP

(57) ABSTRACT

The present invention relates to chewing or bubble gum compositions that include a first region composition and a second, or gum, region adjacent to or surrounding the first region. The first region composition may be a center-fill composition, such as a liquid-fill composition. The second region includes a polyol composition including isomalt alone or in combination with other polyols. The addition of isomalt to the second region provides stability to the chewing gum composition and reduces the problem of leaking and migration of the first region composition into the second region. The multi-region chewing gum composition also may include a coating region which surrounds or covers the second region.

22 Claims, 2 Drawing Sheets

Related U.S. Application Data continuation-in-part of application No. 11/410,962, filed on Apr. 25, 2006, now abandoned, which is a continuation-in-part of application No. 11/210,954, filed on Aug. 24, 2005, now abandoned, which is a continuation-in-part of application No. 10/925,822, filed on Aug. 25, 2004, now Pat. No. 7,641,926.

(60) Provisional application No. 60/776,637, filed on Feb. 24, 2006, provisional application No. 60/683,634, filed on May 23, 2005.

(56) References Cited

OTHER PUBLICATIONS

Grenby et al Developments in Sweeteners-2, pp. 15-16 applied Science Publishers 1983.*

* cited by examiner

MULTI-REGION CHEWING GUM COMPOSITION INCLUDING ISOMALT GUM REGION

CROSS-REFERENCE TO RELATED APPLICATIONS

This application is a continuation of U.S. application Ser. No. 11/829,232, filed Jul. 27, 2007, which is a continuation-in-part of U.S. patent application Ser. No. 11/410,962, filed Apr. 25, 2006, which claims the benefit of U.S. Provisional Application No. 60/776,637, filed Feb. 24, 2006, and U.S. Provisional Application No. 60/683,634, filed May 23, 2005, and U.S. patent application Ser. No. 11/410,962 is a continuation-in-part of U.S. patent application Ser. No. 11/210,954, filed on Aug. 24, 2005, which is a continuation-in-part of U.S. patent application Ser. No. 10/925,822, filed Aug. 25, 2004, the contents all of which are incorporated herein by reference.

FIELD

The present invention includes compositions for multi-region chewing gum products. In particular, the individual chewing gum pieces include a first region surrounded by a second, or gum, region and the second region includes isomalt alone or in combination with other polyols.

BACKGROUND

Liquid or center-filled gum and other confectionery products are in popular demand today. Typically, these products have a solid exterior portion and a soft or liquid-type center. The outer portion can be chewing gum or bubble gum of some type, while the liquid center portion can be a flavored material typically having a syrup-like consistency.

There has been a difficulty in preparing some center-filled products, however. It has been found that certain center-fill compositions tend to leak and migrate. The center-fill compositions tend to be absorbed into the chewing gum region. This is particularly problematic in liquid-filled chewing gum compositions. The problem of migration is especially evident when certain polyols, such as sorbitol, are used in the chewing gum region. For instance, sorbitol has a high porosity, and thus, readily absorbs liquid from the center-fill composition.

There is a need for new gum compositions, and particularly hard or crunchy coated gums, which provide the desired hard shell coating layer in combination with a multi-region, such as a center-filled, gum, while resisting loss of liquidity. There is also a need for a multi-region gum, which retains its liquid region composition during manufacturing and during its shelf-life, and which can be made in a reduced piece-size without loss of the liquid-region properties.

SUMMARY

It has been found that by adding isomalt to the second, or gum, region of the product, greater stability can be achieved, thus lessening the problems of leaking and migration of the center-fill composition (including migration of hydrophobic and hydrophilic components). Isomalt possesses a variety of characteristics that provide advantages for use in the gum region of multi-region, such as center-fill, gum. In particular, isomalt's particle size, particle surface area, water-solubility and moisture-sorption characteristics make it desirable for use in such chewing gum compositions. The inclusion of isomalt in the gum region, either alone or in combination with other polyols, provides shelf-life stability due to reduced absorption of other regions, such as a center-fill region, into the gum region, as well as dimensional stability and seal integrity in the machined chewing gum pieces. Dimensional stability and seal integrity allow for machinability of smaller chewing gum pieces than in the past.

In some embodiments, there is provided a multi-region chewing gum composition including a first region composition and a second region composition adjacent to the first region composition, the second region including an elastomer and a polyol composition including isomalt alone or in combination with at least a second polyol.

Some embodiments provide a center-fill chewing gum composition including a center-fill composition and a gum region composition surrounding the center-fill composition, the gum region composition including a gum base and a polyol composition including isomalt alone or in combination with at least a second polyol.

Some embodiments provide a center-fill chewing gum composition including a liquid center-fill composition and a gum region surrounding the center-fill composition, the gum region including an elastomer and a polyol composition including isomalt in amounts of about 75% to about 100% by weight of the polyol composition and sorbitol in amounts of about 0% to about 25% by weight of the polyol composition.

Some embodiments provide a method of preparing a multi-region chewing gum composition, which includes the steps of:
(a) extruding a multi-region composition including a first region composition and a second region composition adjacent to the first region composition, the second region composition including:
  (i) an elastomer; and
  (ii) a polyol composition including isomalt alone or in combination with at least a second polyol;
(b) sizing the multi-region composition;
(c) feeding the multi-region composition into a forming mechanism;
(d) forming individual pieces of the multi-region composition; and
(e) coating the individual pieces with a coating.

DETAILED DESCRIPTION

Figure 1:
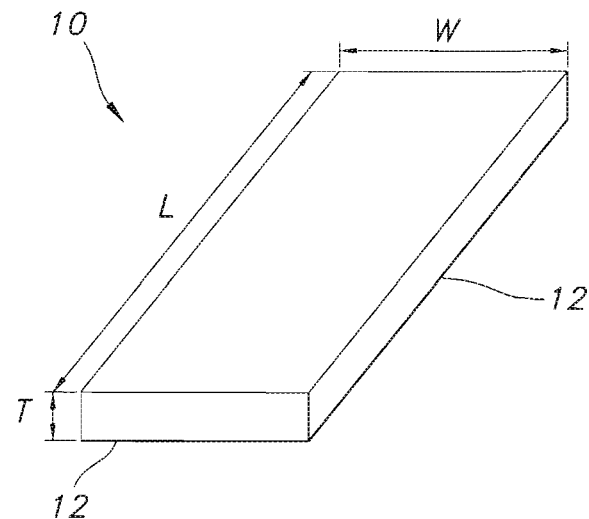
FIG. 1 is a perspective showing of a typical gum slab of the type employed in some embodiments.

In some embodiments there is a multi-region chewing gum composition that includes a first region composition and a second region composition adjacent to the first region composition. For instance, the first region composition may be a center-fill composition and the second region composition may be a gum region surrounding the center-fill. The first region composition may be a liquid composition, and may include components, such as flavors, sweeteners and the like. The second region composition includes an elastomer and a polyol composition including isomalt alone or in combination with at least a second polyol, such as, for example, sorbitol.

Isomalt is disaccharide alcohol. Isomalt can be prepared by hydrogenating isomaltulose. Products of the hydrogenation can include 6-O-α-D-glucopyranosyl-D-sorbitol (1,6-GPS); 1-O-α-D-glucopyranosyl-D-sorbitol (1,1-GPS); 1-O-α-D-glucopyranosyl-D-mannitol (1,1-GPM); 6-O-α-D-glucopyranosyl-D-mannitol (1,6-GPM); and mixtures thereof. Some commercially available isomalt materials include an almost equimolar mixture of 1,6-GPS, and 1,1-GPM. Other isomalt materials can include pure 1,6-GPS; 1,1-GPS; 1,6-GP; and 1,1-GPM. Still other isomalt materials can include mixtures of 1,6-GPS; 1,1-GPS; 1,6-GPM; and 1,1-GPM at any ratio.

As mentioned above, the inclusion of isomalt in the second region composition of multi-region chewing gum provides stability to the chewing gum. Isomalt possess a number of advantageous characteristics for use in the second region of multi-region chewing gum, including particle size, surface area and water-solubility, among others. In general, the particle size of isomalt used in the second region may be about 15 to about 100 microns, more specifically about 15 to about 70 microns, and even more specifically about 20 to about 50 microns. These particles sizes are substantially lower than conventionally used polyols, which typically have particle sizes of much greater than 100 microns. The surface area of isomalt used in the gum region may be about 0.5 m²/g. Additionally, the solubility of isomalt in water is less than 35% at 30° C. In contrast, the solubility of maltitol in water is about 60% at 30° C. The low water-solubility of isomalt prevents its solubilization during processing, thereby adding to the improved dimensional stability of the manufactured chewing gum pieces.

In some embodiments, isomalt may be present in amounts of about 60% to about 100% by weight of the polyol composition, more specifically about 75% to about 100% by weight of the polyol composition. Additional polyols may be included in the polyol composition, such as, but not limited to, sorbitol, maltitol, erythritol, xylitol, mannitol, lactitol and combinations thereof. In some embodiments, for instance, the polyol composition includes about 50% to about 100% by weight isomalt and about 0% to about 50% by weight sorbitol. In some other embodiments, the polyol composition includes about 75% to about 100% by weight isomalt and about 0% to about 25% by weight sorbitol. The ratio of isomalt to sorbitol in the polyol composition may be about 3:2 to about 4:1 in some embodiments. In some embodiments including isomalt and sorbitol, isomalt may have a particle size as described above and sorbitol may have a particle size of about 200 to about 250 microns.

In addition to isomalt, syrups also may be added to the second region. Syrups may include hydrogenated starch hydrolystates, particularly Lycasin®. The syrup may also include sugars, triacetin, lectithin, and polyols such as hydrogenated starch hydrolysates, sorbitol, maltitol, glycerin, and combinations thereof.

In some embodiments, the syrup may act to saturate the polyol composition in the second region, thereby reducing the tendency of the first region composition to be absorbed into the second region. Such syrups may be present in amounts of about 1% to about 15% by weight of the chewing gum composition, more specifically about 3% to about 12% by weight, and even more specifically about 9% to about 12% by weight in some embodiments.

In some embodiments including a syrup, the ratio of the polyol composition to the syrup is about 15:1 to about 4:1 in the gum region. More specifically, in some embodiments the ratio of the polyol composition to the syrup is about 8:1 to about 6:1.

The multi-region chewing gum compositions described herein exhibit improved dimensional stability and more robust seals as compared to conventional chewing gum compositions. The improved machinability of the chewing gum compositions allows for the manufacturing of smaller multi-region gum pieces than with prior chewing gum compositions. For instance, the chewing gum compositions described herein can be used to form multi-region gum pieces having an individual piece weight of about 1.2 g as opposed to weights of about 1.6 g or higher. Accordingly, in some embodiments, the chewing gum pieces may have an individual piece weight of about 1.2 g to about 1.6 g. Smaller gum pieces are commercially desirable and additionally have been found to coat more uniformly than larger, conventional center-fill gum pieces.

In some embodiments, multi-region chewing gums can include multi-layer gums such as three-layer gums in which the center layer has a first surface in contact with a first gum layer and a second surface in contact with a second gum layer. Incorporation of isomalt into one or both of the chewing gum layers, as described herein, may be desirable to prevent, or at least reduce, migration of the center-layer composition into the two gum layers. Moreover, reducing such migration may be desirable to maintain the distinct characteristics, such as the textures or flavors, of each separate layer. In some embodiments, migration of the hydrophilic and/or hydrophobic components contained in the center-layer composition is reduced. For instance, it may be desirable to reduce migration of water and/or oils contained in the center-layer composition, which, in addition to affecting the stability of the chewing gum piece, may affect the characteristics of the chewing gum layers. Barrier layers also may be used in some embodiments to assist in reducing migration of the center-layer composition, such as described in assignee's co-pending U.S. application Ser. No. 11/411,543, filed on Apr. 26, 2006.

As used herein the transitional term "comprising," (also "comprises," etc.) which is synonymous with "including," "containing," or "characterized by," is inclusive or open-ended and does not exclude additional, unrecited elements or method steps, regardless of its use in the preamble or the body of a claim.

As used herein, the terms "bubble gum" and "chewing gum" are used interchangeably and are both meant to include any gum compositions.

As used herein, the terms "first region" or "center-fill" refer to the innermost region of the compositions. These terms do not imply symmetry of a gum piece, only that the "first region" or "center-fill" is adjacent to or within another region of the gum piece. In some embodiments, more than one center-fill may be present.

As used herein, the terms "second region" and "gum region" refer to a region of the compositions that may be adjacent to or at least partially surrounding the center-fill, or first, region.

As used herein, the term "coating" is used to refer to the outermost region of the compositions. The term "coating" can include particulate or non-particulate compositions.

As used herein, the terms "surround," "surrounding," and the like are not limited to encircling. These terms may refer to enclosing or confining on all sides, encircling or enveloping, and are not limited to symmetrical or identical thicknesses for a region in the gum product.

As used herein, the term "liquid" refers to compositions which will readily flow or maintain fluid properties at room temperature and pressure. The term "liquid" also includes compositions which may be homogeneous or non-homogeneous mixtures of multiple liquids.

As used herein, the term "ingredient" and the term "component" are used interchangeably to describe any additive, fixing, substance, material, agent, active, element, or part that may be included in the gum compositions of some embodiments.

As used herein, the term "multi-region" refers to compositions with more than one region with distinct compositions. Such "multi-region" compositions can be configured in any way including concentric multiple layers, horizontal/vertical layers, and the like. As such, the multiple layers can surround at least a portion of each and/or can be adjacent to each other.

As mentioned above, embodiments described herein provide a multi-region chewing gum composition which includes at least one first region, such as a center-fill region, and a second region, such as a gum region, which includes an elastomer and a polyol composition, including isomalt alone or in combination with other polyols. The individual gum piece also may include an outer gum coating or shell, which typically provides a crunchiness to the piece when initially chewed. The individual gum pieces may form a variety of shapes including pellet, tablet, ball, pillow, chunk, stick and slab, among others.

Figure 2:
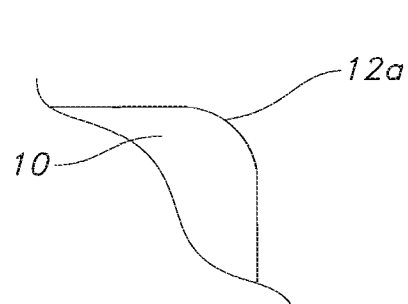
FIGS. 2 and 3 show two arrangements for edge shapes of the slab of FIG. 1.
Figure 3:
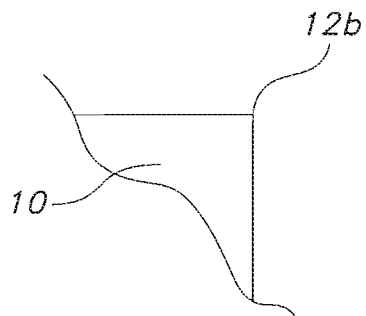
Figure 4:
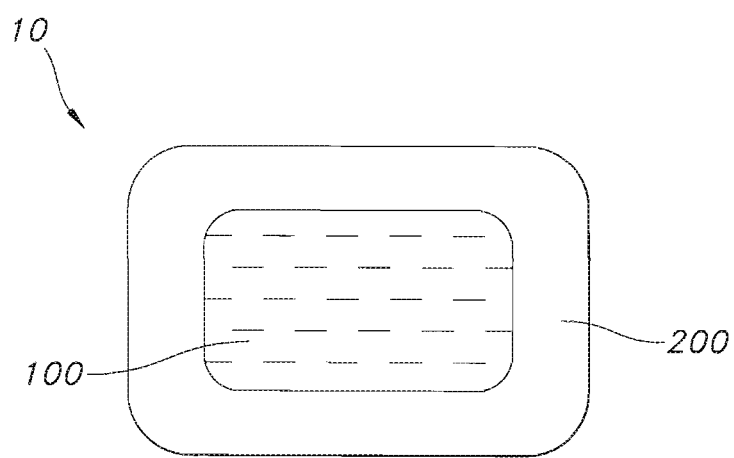
FIG. 4 is a schematic cross-sectional showing of the slab of FIG. 1.

For instance, in some embodiments, the individual gum piece may be in the form of a slab 10, as shown in FIG. 1. The slab 10 may have a length (l), a width (w) and a thickness (t) being bounded by respective edges 12 thereof. The length of the slab may be about 20 mm to about 80 mm, specifically about 25 mm to about 55 mm, and more specifically about 25 mm to about 45 mm. The width of the slab may be about 5 mm to about 50 mm, specifically about 10 mm to about 30 mm, and more specifically about 10 mm to about 15 mm. The thickness of the slab may be about 0.5 mm to about 30 mm, specifically about 0.5 mm to about 20 mm, and more specifically about 0.5 mm to about 10 mm. One or more of the edges 12 of the slab 10 may have any configuration suitable for a chewing gum piece, such as including a rounded corner 12a or a squared corner 12b, as shown in FIGS. 2 and 3, respectively. As seen in the cross-sectional view shown in FIG. 4, the slab 10 includes a liquid-fill composition center 100 and a gum region 200 surrounding the liquid-fill composition center.

In some embodiments, an outer coating may at least partially surround the slab. In particular, one side of the slab may be coated, two sides of the slab may be coated, or a coating may surround the entire gum slab. The coating applied to the slab may have a thickness of about 1 micron to about 7 mm. Suitable coating compositions are described in more detail below.

In some embodiments, the components of the composition may be in different configurations depending on the desired shape of the total gum composition. The first region area or areas may be in either a concentric configuration with respect to the second region or in a layered configuration. A concentric configuration may be acceptable for a ball, pillow or pellet shape, while a layered configuration may be more suitable for a slab or a stick shape. For example, if the total gum composition is in a ball shape, a hollow, circular shell may be formed in the innermost region of the gum piece. The shell may be filled with a first region composition, and the other regions or layers of the gum piece may encircle the center-filled area. However, if the total gum composition is in a slab shape, a hollow shell formed in the innermost region may be of a rectangular shape. The rectangular-shaped shell may be filled with a first region composition, and the other regions or layers of the gum piece may enclose or confine the rectangular center-filled area on all sides of the rectangle.

In some embodiments, the second region may have a non-uniform thickness. In particular, the second region in layered configuration embodiments may be thinner on the ends than on the sides of the gum piece.

The first region of the gum composition may be a liquid, solid or semi-solid, gas, or the like. Embodiments that include a liquid first region composition, as well as some semi-solid first region compositions, may involve concerns regarding retention of the liquid composition (including both hydrophilic and hydrophobic components) during manufacturing and shelf-life, as mentioned above. It may be desirable, therefore, to employ second region compositions with liquid-fill gums that substantially reduce or prevent leaking of the liquid composition. Suitable second region compositions are discussed in detail herein.

In some embodiments, the first region may be substantially or completely filled with the liquid, solid, semi-solid or gaseous first region composition. In some other embodiments, the first region may be only partially filled with the liquid, solid, semi-solid or gaseous first region composition.

In some embodiments, the first region may include two or more first region compositions. The two or more first region compositions may be the same or different forms. For example, some embodiments may contain a mixture of two or more distinct liquids, which may or may not be miscible. Similarly, some embodiments may contain two or more distinct solids, semi-solids or gasses in the first region. Mixtures of different first region forms also may be included in some embodiments. For example, a liquid and a solid may be included in the first region. The two or more liquids, solids, semi-solids and/or gasses employed in the first region may be included in the same or different amounts and may have similar or distinct characteristics. More specifically, in some embodiments, the two or more first region compositions may differ in a variety of characteristics, such as, viscosity, color, flavor, taste, sensation, ingredient components, functional components, sweeteners, or the like.

In some embodiments, the first region composition also may include non-liquid components, such as, for example, flavor beads, fruit particles, nut particles, flavor particles, gelatin portions, and the like.

The multi-region gum composition and other compositions described herein may be formed by any technique known in the art which includes the method described by U.S. Pat. No. 6,280,780 to Degady et al. ("Degady") which is herein incorporated by reference in its entirety. Degady describes an apparatus and method for forming center-filled gum pellets. The method includes first extruding a liquid-filled rope of a chewing gum layer and passing the rope through a sizing mechanism including a series of pairs of pulley-shaped roller members. The roller members "size" the rope or strand of gum material such that it leaves the series of rollers with the desired size and shape for entering a tablet-forming mechanism.

The rope is then led into a tablet-forming mechanism including a pair of rotating chain die members which are endless chain mechanisms and both rotate at the same speed by a motor and gear mechanism. Each of the chain mechanisms include a plurality of open curved die groove members which mate and form die cavities in which the pieces of gum material (pellets or tablets) are formed. While Degady is limited to the formation of pellet or tablet shaped pieces, the gum pieces may be of other shapes as described above. The shape of the die groove members may be altered to provide any desired shape.

The gum may optionally be passed through a cooling tunnel either before entering the tablet-forming mechanism, after exiting the tablet-forming mechanism or both. Cooling of the rope prior to entering the tablet-forming mechanism may be beneficial to prevent rebound of the individual pieces and thus may provide an increase in productivity.

The cooled pieces of gum material are then fed into a storage container for conditioning and further processing. At this point, the cooled pieces of gum material could also be fed directly into a coating tunnel mechanism, such as a rotating tunnel mechanism.

Whether the pieces of formed gum material are first stored, transported in a storage container, or fed directly into a coating tunnel or mechanism, the individual pieces of gum material may subsequently be subjected to a conventional sugar or sugarless coating process in order to form a hard exterior shell on the liquid-filled gum material. A variety of coating processes or mechanisms of this type are known. In some embodiments, the coating is applied in numerous thin layers of material in order to form an appropriate uniform coated and finished quality surface on the gum products. The hard coating material, which may include sugar, maltitol, sorbitol or any other polyol, including those described herein, and optionally flavoring, is sprayed onto the pellets of gum material as they pass through a coating mechanism or a coating tunnel and are tumbled and rotated therein. In addition, conditioned air is circulated or forced into the coating tunnel or mechanism in order to dry each of the successive coating layers on the formed products. In some embodiments, the coating, or outermost region, can be formed by lamination, dual or multiple extrusion, or any other process that creates an outermost region.

The coating composition may range from about 2% to about 80%, more specifically, about 20% to about 40% by weight of an individual gum piece which includes a first region, a second region and a coating; even more specifically, from 25% to 35% and still more specifically around 30%. The coating may include sugar or polyol such as maltitol as the primary component, but may also include flavors, colors, etc. as described below in the discussion of the second region. The coating or outermost region may be crystalline or amorphous.

In some embodiments, the multi-region chewing gum provides resistance to migration from the first region to the second region by modifying the second region to include isomalt. It may be desirable to prevent or at least reduce migration of both the hydrophilic, particularly water, and hydrophobic, particularly oil, components contained in the first region composition. This is particularly relevant for liquid-fill chewing gum embodiments. This is in contrast to conventional approaches and which have not fully addressed the problems associated with manufacturing and shelf-stability of liquid center-filled products.

The size of the multi-region chewing gum product may also affect the performance and stability of the gum composition. For instance, for center-fill pellets, the gum size is optimally between about 18-21 mm in length, about 12-16 mm in width, and about 7-10 mm in height. Desirably, the gum piece is about 19 mm in length, about 14 mm in width, and about 8 mm in height. The gum piece (with coating) optimally weighs about 1.5-3 grams, and most desirably about 2 grams.

In some embodiments, there are included smaller piece-sizes. Historically, liquid center-filled gum piece sizes ranged from about 5-7 grams. In some embodiments described herein, liquid filled products have been made using substantially smaller piece sizes, i.e., 50-60% smaller by weight, without loss of liquidity or migration of liquid into the gum region or beyond into the coating. Some embodiments provide a liquid-filled gum piece size range which is greater than about 0.5 grams, more specifically greater than 1.5 grams up to about 3 grams, including the addition of an outer hard coating shell. In addition, in some embodiments a gum piece may include a first region, such as a center-fill, a second region, such as a gum region including an elastomer, and an outer coating. Such gum pieces may be about 2.2 grams total weight per piece.

With respect to liquid-fill embodiments, it has been discovered that pieces of such small size and particularly with gum shapes or configurations having proportionally more liquid-fill surface area as compared to the weight of the liquid per se, have a greater tendency to lose the liquidity of the first region due to the interaction of different factors. While not limited to a single theory, these factors include the small amount of liquid-fill in comparison to the surface of the second, or gum, region in which the liquid-fill is in direct contact, the interaction of the type of elastomer with the liquid-fill (i.e. SBR versus non-SBR), the compatibility of the second region components with the liquid-fill components, and the potential capillary action of the polyol used in the second region. For example, the structure of sorbitol, which is customarily used in gum formulations in the United States, does not provide a tightly packed crystalline structure, giving almost a sponge-like appearance. Therefore, in order to provide a multi-region gum piece of less than about 3 grams, the present invention alters the second region to include a polyol composition which is unlike the sponge-like structure in conventional sorbitol second region formulations, in order to provide a multi-region gum piece which resists loss of liquidity.

For other useful multi-region gum compositions and/or components for use therein, see the following co-pending commonly owned patent applications, the contents of which are incorporated herein by reference in their entirety: U.S. application Ser. No. 11/710,830 (Attorney Docket No. 1421-5 CIP II), filed on Feb. 26, 2007, entitled "Liquid-Filled Chewing Gum Composition"; U.S. application Ser. No. 11/710,758, filed on Feb. 26, 2007, entitled "Liquid-Filled Chewing Gum Composition"; U.S. application Ser. No. 11/408,761, filed on Apr. 21, 2006, entitled "Liquid-Filled Chewing Gum Composition"; U.S. application Ser. No. 11/411,543 , filed on Apr. 26, 2006, entitled "Center-Filled Chewing Gum with Barrier Layer"; U.S. application Ser. No. 11/414,919, filed on May 1, 2006, entitled "Center-Filled Chewing Gum Composition"; and U.S. application Ser. No. 11/415,043, filed on May 1, 2006, entitled "Multi-Modality Chewing Gum Composition".

Second or Gum Region

The gum region, also referred to as the second region in the claims, may include one or more cavities therein to house the first region composition. The shape of the cavity will be largely dictated by the final configuration of the chewing gum piece. The second region also may include a polyol composition including isomalt alone or in combination with at least a second polyol, such as sorbitol.

In some liquid-fill embodiments, the second region may provide a liquid barrier to surround and prevent the liquid-fill from migration and premature release. By selection of the ratio of the desired cavity surface area to the liquid-fill weight, optimization of the reduction in potential liquid-fill migration in to the gum region area can be achieved. This is particularly useful when the gum piece size is desired to be substantially smaller than conventional commercialized gum pieces. In particular, liquid-filled pellet gums having sizes of 2 to 3 grams by weight of the entire gum piece have been successfully made. However, smaller gum pieces, as small as about 0.5 grams are contemplated.

As mentioned above, the second region includes an elastomer and a polyol composition. In some embodiments, the second, or gum, region includes a gum base and a polyol composition. The polyol composition includes isomalt alone or in combination with one or more additional polyols, such as sorbitol, maltitol, erythritol, xylitol, mannitol, lactitol, or the like, and combinations thereof. The isomalt-based gum region improves the stability and machinability of multi-region chewing gum pieces made from the chewing gum compositions described herein.

The gum base may include any component known in the chewing gum art. For example, the second region may include elastomers, bulking agents, waxes, elastomer solvents, emulsifiers, plasticizers, fillers and mixtures thereof. Wherein the second region is included in a three component composition including a first region, a second region and a coating layer, the second region may comprise from about 40% to about 97%, more specifically from about 55% to about 65% by weight of the chewing gum piece, even more specifically about 62%.

The amount of the gum base, such as the elastomer(s), which is present in the gum region may also vary. In some embodiments, the gum base may be included in the gum region in an amount from about 25% to about 45% by weight of the gum region. A more specific range of gum base in some embodiments may be from about 28% to about 42% by weight of the gum region. Even more specifically, the range may be from about 28% to about 35% or from about 28% to about 30% in some embodiments. Alternatively, in some high gum base embodiments, the gum base may be present in an amount from about 45% to about 100% by weight of the gum region.

The elastomers (rubbers) employed in the gum base will vary greatly depending upon various factors such as the type of gum base desired, the consistency of gum composition desired and the other components used in the composition to make the final chewing gum product. The elastomer may be any water-insoluble polymer known in the art, and includes those gum polymers utilized for chewing gums and bubble gums. Illustrative examples of suitable polymers in gum bases include both natural and synthetic elastomers. For example, those polymers which are suitable in gum base compositions include, without limitation, natural substances (of vegetable origin) such as chicle, natural rubber, crown gum, nispero, rosidinha, jelutong, perillo, niger gutta, tunu, balata, guttapercha, lechi capsi, sorva, gutta kay, and the like, and combinations thereof. Examples of synthetic elastomers include, without limitation, styrene-butadiene copolymers (SBR), polyisobutylene, isobutylene-isoprene copolymers, polyethylene, polyvinyl acetate and the like, and combinations thereof. Copolymers include alternating copolymers with regular alternating A and B units, periodic copolymers with A and B units arranged in a repeating sequence (e.g. $(A-B-A-B-B-A-A-A-B-B-B)_n$ random copolymers with random sequences of monomer A and B, statistical copolymers in which the ordering of the distinct monomers within the polymer sequence obeys known statistical rules, and block copolymers.

Additional useful polymers include: crosslinked polyvinyl pyrrolidone, polymethylmethacrylate; copolymers of lactic acid, polyhydroxyalkanoates, plasticized ethylcellulose, polyvinyl acetatephthalate and combinations thereof.

The amount of elastomer employed in the gum base may vary depending upon various factors such as the type of gum base used, the consistency of the gum composition desired and the other components used in the composition to make the final chewing gum product. In general, the elastomer will be present in the gum base in an amount from about 10% to about 60% by weight of the gum region, desirably from about 35% to about 40% by weight.

In some embodiments, the gum base may include wax. It softens the polymeric elastomer mixture and improves the elasticity of the gum base. When present, the waxes employed will have a melting point below about 60° C., and preferably between about 45° C. and about 55° C. The low melting wax may be a paraffin wax. The wax may be present in the gum base in an amount from about 6% to about 10%, and preferably from about 7% to about 9.5%, by weight of the gum base.

In addition to the low melting point waxes, waxes having a higher melting point may be used in the gum base in amounts up to about 5%, by weight of the gum base. Such high melting waxes include beeswax, vegetable wax, candelilla wax, carnuba wax, most petroleum waxes, and the like, and mixtures thereof.

In addition to the components set out above, the gum base may include a variety of other ingredients, such as components selected from elastomer solvents, emulsifiers, plasticizers, fillers, and mixtures thereof.

The gum base may contain elastomer solvents to aid in softening the elastomer component. Such elastomer solvents may include those elastomer solvents known in the art, for example, terpinene resins such as polymers of alpha-pinene or beta-pinene, methyl, glycerol and pentaerythritol esters of rosins and modified rosins and gums such as hydrogenated, dimerized and polymerized rosins, and mixtures thereof. Examples of elastomer solvents suitable for use herein may include the pentaerythritol ester of partially hydrogenated wood and gum rosin, the pentaerythritol ester of wood and gum rosin, the glycerol ester of wood rosin, the glycerol ester of partially dimerized wood and gum rosin, the glycerol ester of polymerized wood and gum rosin, the glycerol ester of tall oil rosin, the glycerol ester of wood and gum rosin and the partially hydrogenated wood and gum rosin and the partially hydrogenated methyl ester of wood and rosin, and the like, and mixtures thereof. The elastomer solvent may be employed in the gum base in amounts from about 2% to about 15%, and preferably from about 7% to about 11%, by weight of the gum base.

The gum base may also include emulsifiers which aid in dispersing the immiscible components into a single stable system. The emulsifiers useful in this invention include glyceryl monostearate, lecithin, fatty acid monoglycerides, diglycerides, propylene glycol monostearate, and the like, and mixtures thereof. The emulsifier may be employed in amounts from about 2% to about 15%, and more specifically, from about 7% to about 11%, by weight of the gum base.

The gum base may also include plasticizers or softeners to provide a variety of desirable textures and consistency properties. Because of the low molecular weight of these ingredients, the plasticizers and softeners are able to penetrate the fundamental structure of the gum base making it plastic and less viscous. Useful plasticizers and softeners include lanolin, palmitic acid, oleic acid, stearic acid, sodium stearate, potassium stearate, glyceryl triacetate, glyceryl lecithin, glyceryl monostearate, propylene glycol monostearate, acetylated monoglyceride, glycerine, and the like, and mixtures thereof. Waxes, for example, natural and synthetic waxes, hydrogenated vegetable oils, petroleum waxes such as polyurethane waxes, polyethylene waxes, paraffin waxes, microcrystalline waxes, fatty waxes, sorbitan monostearate, tallow, propylene glycol, mixtures thereof, and the like, may also be incorporated into the gum base. The plasticizers and softeners are generally employed in the gum base in amounts up to about 20% by weight of the gum base, and more specifically in amounts from about 9% to about 17%, by weight of the gum base.

Plasticizers also include are the hydrogenated vegetable oils and include soybean oil and cottonseed oil which may be employed alone or in combination. These plasticizers provide the gum base with good texture and soft chew characteristics. These plasticizers and softeners are generally employed in amounts from about 5% to about 14%, and more specifically in amounts from about 5% to about 13.5%, by weight of the gum base.

Anhydrous glycerin may also be employed as a softening agent, such as the commercially available United States Pharmacopeia (USP) grade. Glycerin is a syrupy liquid with a sweet warm taste and has a sweetness of about 60% of that of cane sugar. Because glycerin is hygroscopic, the anhydrous glycerin may be maintained under anhydrous conditions throughout the preparation of the chewing gum composition.

In some embodiments, the gum base may also include effective amounts of bulking agents such as mineral adjuvants which may serve as fillers and textural agents. Useful mineral adjuvants include calcium carbonate, magnesium carbonate, alumina, aluminum hydroxide, aluminum silicate, talc, tricalcium phosphate, dicalcium phosphate, calcium sulfate and the like, and mixtures thereof. These fillers or adjuvants may be used in the gum base compositions in various amounts. The amount of filler, may be present in an amount from about zero to about 40%, and more specifically from about zero to about 30%, by weight of the gum base. In some embodiments, the amount of filler will be from about zero to about 15%, more specifically from about 3% to about 11%.

A variety of traditional ingredients may be optionally included in the gum base in effective amounts such as coloring agents, antioxidants, preservatives, flavoring agents, high intensity sweeteners, and the like. For example, titanium dioxide and other dyes suitable for food, drug and cosmetic applications, known as F. D. & C. dyes, may be utilized. An anti-oxidant such as butylated hydroxytoluene (BHT), butylated hydroxyanisole (BHA), propyl gallate, and mixtures thereof, may also be included. Other conventional chewing gum additives known to one having ordinary skill in the chewing gum art may also be used in the gum base. A variety of components which may be added to the gum region, or alternatively to the liquid-fill region or coating are described in greater detail in the section entitled "Additional Components" hereinbelow.

Some embodiments extend to methods of making the multi-region gum compositions. The manner in which the gum base components are mixed is not critical and is performed using standard techniques and apparatus known to those skilled in the art. In a typical method, an elastomer is admixed with an elastomer solvent and/or a plasticizer and/or an emulsifier and agitated for a period of from 1 to 30 minutes. The remaining ingredients, such as the low melting point wax, are then admixed, either in bulk or incrementally, while the gum base mixture is blended again for 1 to 30 minutes.

The gum composition may include amounts of conventional additives selected from the group consisting of sweetening agents (sweeteners), plasticizers, softeners, emulsifiers, waxes, fillers, bulking agents (carriers, extenders, bulk sweeteners), mineral adjuvants, flavoring agents (flavors, flavorings), coloring agents (colorants, colorings), antioxidants, acidulants, thickeners, medicaments, and the like, and mixtures thereof. Some of these additives may serve more than one purpose. For example, in sugarless gum compositions, a sweetener, such as maltitol or other sugar alcohol, may also function as a bulking agent.

The plasticizers, softening agents, mineral adjuvants, waxes and antioxidants discussed above, as being suitable for use in the gum base, may also be used in the chewing gum composition. Examples of other conventional additives which may be used include emulsifiers, such as lecithin and glyceryl monostearate, thickeners, used alone or in combination with other softeners, such as methyl cellulose, alginates, carrageenan, xanthan gum, gelatin, carob, tragacanth, locust bean gum, pectin, alginates, galactomannans such as guar gum, carob bean gum, glucomannan, gelatin, starch, starch derivatives, dextrins and cellulose derivatives such as carboxy methyl cellulose, acidulants such as malic acid, adipic acid, citric acid, tartaric acid, fumaric acid, and mixtures thereof, and fillers, such as those discussed above under the category of mineral adjuvants.

In some embodiments, the second region may also contain a bulking agent. Suitable bulking agents may be water-soluble and include sweetening agents selected from, but not limited to, monosaccharides, disaccharides, polysaccharides, sugar alcohols, and mixtures thereof; randomly bonded glucose polymers such as those polymers distributed under the tradename Litesse™ which is the brand name for polydextrose and is manufactured by Danisco Sweeteners, Ltd. of 41-51 Brighton Road, Redhill, Surryey, RH1 6YS, United Kingdom.; isomalt (a racemic mixture of alpha-D-glucopyranosyl-1,6-mannitol and alpha-D-glucopyranosyl-1,6-sorbitol manufactured under the tradename PALATINIT by Palatinit Sussungsmittel GmbH of Gotlieb-Daimler-Strause 12 a, 68165 Mannheim, Germany); maltodextrins; hydrogenated starch hydrolysates; hydrogenated hexoses; hydrogenated disaccharides; minerals, such as calcium carbonate, talc, titanium dioxide, dicalcium phosphate; celluloses; and mixtures thereof.

Suitable sugar bulking agents include monosaccharides, disaccharides and polysaccharides such as xylose, ribulose, glucose (dextrose), lactose, mannose, galactose, fructose (levulose), sucrose (sugar), maltose, invert sugar, partially hydrolyzed starch and corn syrup solids, and mixtures thereof.

Suitable sugar alcohol bulking agents include sorbitol, xylitol, mannitol, galactitol, lactitol, maltitol, erythritol, isomalt and mixtures thereof.

Suitable hydrogenated starch hydrolysates include those disclosed in U.S. Pat. No. 4,279,931 and various hydrogenated glucose syrups and/or powders which contain sorbitol, maltitol, hydrogenated disaccharides, hydrogenated higher polysaccharides, or mixtures thereof. Hydrogenated starch hydrolysates are primarily prepared by the controlled catalytic hydrogenation of corn syrups. The resulting hydrogenated starch hydrolysates are mixtures of monomeric, dimeric, and polymeric saccharides. The ratios of these different saccharides give different hydrogenated starch hydrolysates different properties. Mixtures of hydrogenated starch hydrolysates, such as LYCASIN®, a commercially available product manufactured by Roquette Freres of France, and HYSTAR®, a commercially available product manufactured by SPI Polyols, Inc. of New Castle, Del., are also useful.

The sweetening agents which may be included in the compositions of some embodiments may be any of a variety of sweeteners known in the art. These are described in more detail in the "Additional Components" section herein below and may be used in many distinct physical forms well-known in the art to provide an initial burst of sweetness and/or a prolonged sensation of sweetness. Without being limited thereto, such physical forms include free forms, such as spray dried, powdered, beaded forms, encapsulated forms, and mixtures thereof.

Desirably, the sweetener is a high intensity sweetener such as aspartame, neotame, sucralose, and acesulfame potassium (Ace-K).

In general, an effective amount of sweetener may be utilized to provide the level of sweetness desired, and this amount may vary with the sweetener selected. In some embodiments the amount of sweetener may be present in amounts from about 0.001% to about 3%, by weight of the gum composition, depending upon the sweetener or combination of sweeteners used. The exact range of amounts for each type of sweetener may be selected by those skilled in the art.

In some embodiments, particularly liquid-fill embodiments, the second region may include a specific polyol composition including at least one polyol which is from about 30% to about 80% by weight of said second region, and specifically from 50% to about 60%. In some liquid-fill embodiments, such second region compositions may substantially reduce or prevent leaking of the liquid first region composition. The polyol composition may include any polyol known in the art including, but not limited to maltitol, sorbitol, erythritol, xylitol, mannitol, isomalt, lactitol and combinations thereof. Lycasin™ which is a hydrogenated starch hydrolysate including sorbitol and maltitol, may also be used.

Since sugar (sucrose) is generally accepted as the baseline for comparison of sweeteners, including polyols, the polyol composition of some embodiments is described similarly. For example, the polyol composition of may have a sweetness of greater than about 50% of the sweetness of sucrose. More specifically, in some embodiments, the polyol composition of the present invention may have sweetness greater than about 70% the sweetness of sucrose.

The polyol composition of some embodiments may also be described in terms of the solubility of the composition. The solubility of the polyol composition will depend on the solubility of the one or more polyols included in the composition.

Blends of different polyols may also be used in some embodiments. Examples of useful polyols are erythritol, lactitol, xylitol, mannitol, maltitol, sorbitol, isomalt, and combinations thereof. Where a blend of more than one polyol is used, the solubility of the polyol composition will depend on a weighted ratio of the amount of the polyol in the blend and the solubility of each individual polyol which is included. For example, in some embodiments, a combination of two or more polyols may have a water solubility range of about 60% to about 72%, if it includes maltitol, which has a water solubility of 60% at 25° C., and sorbitol, which has a water solubility of about 72% at 25° C. Other suitable solubility ranges, which depend on the included two or more polyols include the ranges from about 40% to about 60% at 25° C. and 55% to 65% at 25° C. The range of the solubility may vary, depending on the particular polyols used. Alternative suitable solubilities of a polyol combination include those having a solubility less than sucrose (i.e., less than 67%).

Coloring agents may be used in amounts effective to produce the desired color. The coloring agents may include pigments which may be incorporated in amounts up to about 6%, by weight of the gum composition. For example, titanium dioxide may be incorporated in amounts up to about 2%, and preferably less than about 1%, by weight of the gum composition. The colorants may also include natural food colors and dyes suitable for food, drug and cosmetic applications. These colorants are known as F.D.& C. dyes and lakes. The materials acceptable for the foregoing uses are preferably water-soluble. Illustrative nonlimiting examples include the indigoid dye known as F.D.& C. Blue No. 2, which is the disodium salt of 5,5-indigotindisulfonic acid. Similarly, the dye known as F.D.& C. Green No. 1 comprises a triphenylmethane dye and is the monosodium salt of 4-[4-(N-ethyl-p-sulfoniumbenzylamino)diphenylmethylene]-[1-(N-ethyl-N-p-sulfoniumbenzyl)-delta-2,5-cyclohexadieneimine]. A full recitation of all F.D.& C. colorants and their corresponding chemical structures may be found in the Kirk-Othmer Encyclopedia of Chemical Technology, 3rd Edition, in volume 5 at pages 857-884, which text is incorporated herein by reference. Additional coloring components are described in the "Additional Components" section hereinbelow.

Suitable oils and fats usable in gum compositions include partially hydrogenated vegetable or animal fats, such as coconut oil, palm kernel oil, beef tallow, and lard, among others. These ingredients when used are generally present in amounts up to about 7%, and preferably up to about 3.5%, by weight of the gum composition.

Some embodiments may include a method for preparing the improved chewing gum compositions for the second region, including both chewing gum and bubble gum compositions. The chewing gum compositions may be prepared using standard techniques and equipment known to those skilled in the art. The apparatus useful in accordance with some embodiments comprises mixing and heating apparatus well known in the chewing gum manufacturing arts, and therefore the selection of the specific apparatus will be apparent to the artisan.

With respect to the first region composition, the second region may have a water activity greater than or equal to the water activity of the first region composition. However, in compositions wherein a greater water activity is desired in the first region, the water activity of the first region composition may be greater than that of the second region. A higher moisture content will aid in hydration of thickeners like xanthan gum and cellulose when present in the first region composition.

In some embodiments, the second region may have a total moisture content of about 14% by weight of the second region and more specifically may have a total moisture content from about 9% to about 14% by weight, with a free moisture content of less than about 5%. The first region further may have total moisture content including free and bound moisture from about zero up to about 35% by weight of said first region, specifically about 22%, in some embodiments.

First Region or Center-Fill Composition

The center-fill, also referred to as the first region or interior portion, of the chewing gum composition can take the physical form of a solid, a liquid, a semi-solid or a gas.

Depending on the physical form of the first region composition, adjustments can be made to the adjacent portion of the chewing gum composition that will be in contact with the first region.

In some embodiments, liquid first region compositions may present viscosity differences that can be manipulated for a desired effect. In some embodiments, liquid first region compositions can be formulated to have low viscosities that consumers perceive as refreshing.

In some embodiments, solid first region compositions may be particulate or unitary. In embodiments where the solid first region composition is particulate, the first region composition can include a plurality of particles. In some particulate solid first region composition embodiments, variables such as particle size and particle size distribution can be manipulated for a desired effect. In some embodiments, small particles with narrow particle size distribution can be included in the first region composition to provide rapid dissolution when contacted with saliva.

In embodiments where the solid first region composition is unitary, the first region composition can include a cohesive mass where distinct particles are not discernible. In some unitary solid first region composition embodiments, the texture can be manipulated for a desired effect. In some embodiments, a unitary solid first region composition can include a confectionery format such as nougat to provide a chewy texture experience.

In some embodiments, gaseous first region compositions can form a void in the chewing gum composition that alters the chewing gum composition's texture profile by collapsing upon chewing. In some embodiments, the gaseous first region composition can include a trapped gas such as nitrogen while in other embodiments, the gaseous first region composition can include a mixed gas composition such as air. In some embodiments, the gas can be included in the first region composition as part of a matrix such as a foam or glassy matrix.

Additionally in some embodiments, the physical form of the first region composition can change. In some embodiments, the first region composition can be solid when manufactured and then become liquid over time. In some embodiments, the initially solid first region composition can be a substrate-enzyme blend where the enzyme acts upon the substrate to liquefy the solid. In other embodiments, the initial solid first region composition can be a solid at a manufacturing temperature that is lower than the storage temperature such that the first region composition liquefies as the temperature reaches the storage temperature. In some embodiments, the first region composition is a liquid-filled particle that remains solid until ruptured or disrupted when it releases liquid. In some embodiments, the initially solid first region composition can interact with an adjacent region configured to contain free moisture such that the first region composition pulls moisture from the adjacent region and becomes liquid.

Solid First Region Compositions

In some embodiments, the solid first region composition can include particulates. Particulates can include, but are not limited to nuts; seeds; cocoa beans; coffee beans; milk powders; fruit-containing particles such as restructured fruit as described in U.S. Pat. No. 6,027,758; freeze dried fruit; freeze dried vegetables; fat particles; cocoa powder; sucrose; starch; polyols such as xylitol, erythritol, sorbitol, mannitol, maltitol, isomalt, hydrogenated starch hydrolysates; waxes; and combinations thereof.

In some embodiments, the solid first region composition can include particles onto which other materials have been complexed. In some embodiments, the solid particle can include an absorbent material to which a second material is absorbed. In some embodiments, the solid particle can include an adsorbent material to which a second material is adsorbed. In some embodiments, the solid particle can include a complexation material to which a second material is complexed. In some embodiments, silica particles can absorb at least a second material to form a particulate solid interior portion. In some embodiments, cyclodextrin particles can complex with at least a second material to form a particulate solid interior portion.

In some embodiments where the solid first region composition can change to a liquid, the solid first region composition can include a mixture of invertase and sucrose such invertase operates on sucrose to form liquid invert sugar resulting in a liquid first region composition over time. In some embodiments, the first region composition can be a fat with melting characteristics such that at manufacturing temperatures the fat is solid and then melts to become liquid at storage temperatures. In some embodiments, the solid first region composition can include liquid-filled gelatin or sucrose beads that release liquid when ruptured or disrupted.

In some embodiments, the solid first region composition can include a unitary or particulate solid confectionery composition. Such confectionery compositions can include, but are not limited to, chocolate, compound coating, carob coating, cocoa butter, butter fat, hydrogenated vegetable fat, illipe butter, fondant including fondant-based cremes, fudge, frappe, caramel, nougat, compressed tablet, candy floss (also known as cotton candy), marzipan, hard boiled candy, gummy candy, jelly beans, toffees, jellies including pectin-based gels, jams, preserves, butterscotch, nut brittles or croquant, candied fruit, marshmallow, pastilles, pralines or nougats, flour or starch confectionery, truffles, nonpareils, bon bons, after-dinner mints, fourres, nut pastes, peanut butter, chewing gum, kisses, angel kisses, montelimart, nougatine, fruit chews, Turkish delight, hard gums, soft gums, starch jellies, gelatin jellies, agar jellies, persipan, coconut paste, coconut ice, lozenges, cachous, crème paste, dragees, sugared nuts, sugared almonds, comfits, aniseed balls, licorice, licorice paste, chocolate spreads, chocolate crumb, and combinations thereof.

Liquid First Region Compositions

In some embodiments, the liquid first region composition can be aqueous while in other embodiments the liquid first region composition can be non-aqueous. In some embodiments, the liquid first region composition can be a solution while in other embodiments, the first region composition can be a suspension while in still other embodiments, the first region composition can be an emulsion.

In some embodiments, the viscosity of the liquid first region composition can be manipulated for a variety of reasons including, but not limited to, processing efficiency or creation of a desired perception. In some embodiments, the viscosity of the liquid first region composition can be 3,000 to 10,000 pascal seconds. In some embodiments, the viscosity of the liquid first region composition can be 4,000 to 6,5000 pascal seconds.

In some embodiments, the water activity of the liquid first region composition can be manipulated for a variety of reasons including, but not limited to, microbial stability or maintenance of a desired texture. In some embodiments, the water activity of the liquid first region composition can be 0.1 to 0.7. In some embodiments, the water activity of the liquid first region composition can be 0.25 to 0.35.

Liquids that can be included in the liquid first region composition can include, but are not limited to, fruit juice;

vegetable juice; fruit puree; fruit pulp; vegetable pulp; vegetable puree; fruit sauce; vegetable sauce; honey; maple syrup; molasses; corn syrup; sugar syrup; polyol syrup; hydrogenated starch hydrolysates syrup; emulsions; vegetable oil; glycerin; propylene glycol; ethanol; liqueurs; chocolate syrup, dairy-based liquids such as milk, cream, etc.; and combinations thereof.

Gaseous First Region Compositions

In some embodiments, a gaseous first region composition can be formed by creating a hollow center. The gas can include a mixed composition gas such as air or it can include a single gas such as nitrogen, carbon dioxide, or oxygen. In some embodiments, a gaseous first region composition will include gas trapped in a matrix such as a glassy matrix or foam. In some embodiments where gas can be trapped in a glassy matrix, the glass can be sucrose and the gas can be carbon dioxide. In some embodiments where gas can be introduced into the first region composition in a foam, the foam can include milk proteins and the gas can include a mixed composition gas such as air.

Any of the first region compositions discussed above may include any components known in the art for incorporation with a center-fill composition. In some embodiments, particularly liquid-fill embodiments, for instance, this may include glycerine in addition to one or more other polyols in amounts greater than zero up to about 20%, more specifically, up to about 10% by weight of the total chewing gum composition, i.e., including a first region composition, a second region and a coating. In some embodiments, the first region is approximately 8% by weight of the total chewing gum composition. In some embodiments, the other polyol component includes desirably maltitol, sorbitol, xylitol, or a combination thereof.

In some embodiments, the first region compositions may contain those traditional ingredients well known in the chewing gum and confectionery arts, such as flavoring agents, sweetening agents, and the like, and mixtures thereof, as described above. In addition to confectionery additives, the first region compositions may also contain pharmaceutical additives such as medicaments, breath fresheners, vitamins, minerals, caffeine, fruit juices, and the like, and mixtures thereof. The confectionery and pharmaceutical agents may be used in many distinct physical forms well known in the art to provide an initial burst of sweetness and flavor and/or therapeutic activity or a prolonged sensation of sweetness and flavor and/or therapeutic activity. Without being limited thereto, such physical forms include free forms, such as spray dried, powdered, and beaded forms, and encapsulated forms, and mixtures thereof. Illustrative, but not limiting, examples of liquid centers suitable for use in some embodiments include those centers disclosed in U.S. Pat. Nos. 3,894,154, 4,156,740, 4,157,402, 4,316,915, and 4,466,983, which disclosures are incorporated herein by reference. Specific examples of suitable additional components include taurine, guarana, vitamins, Actizol™, chlorophyll, Recaldent™ tooth remineralization technology, and Retsyn™ .breath freshening technology.

In some embodiments, particularly liquid-fill embodiments, the first region composition also may include a natural or synthetic gum such as carboxymethylcellulose, pectin, propylene glycol aginate, agar and gum tragacanth. These compositions serve to increase viscosity by reducing the amount of free water in the composition. The viscosity of the first region composition may range from about 300 cp to about 6,000 cp at 25° C. In first region compositions which have a greater water activity than the surrounding second region, the viscosity may range from about 3,000 cp to about 6,000 cp at 25° C.

Xanthan gum may also be used to increase the viscosity of the first region composition. In some liquid-fill embodiments, increasing viscosity of the liquid also helps prevent the liquid from leaking through the gum piece. Xanthan gum is available under the tradename Keltrol® from Signet Chemical Corporation.

Some embodiments extend to methods of making the improved multi-region chewing gum compositions. The improved compositions may be prepared using standard techniques and equipment known to those skilled in the art. The apparatus useful in accordance with the embodiments described herein comprises mixing and heating apparatus well known in the chewing gum manufacturing arts, and therefore the selection of the specific apparatus will be apparent to the artisan. Such methods and apparatus are disclosed, for example, in U.S. Pat. Nos. 3,806,290 and 3,857,963, which disclosures are incorporated herein by reference.

Coating Composition

The coating composition, when included in the multi-region chewing gum compositions, may be applied by any method known in the art including the method described above. The coating composition may be present in an amount from about 2% to about 60%, more specifically from about 25% to about 35% by weight of the total multi-region gum piece, even more specifically about 30% by weight of the gum piece.

The outer coating may be hard, crunchy, or soft. Typically, the outer coating may include sorbitol, maltitol, xylitol, erythritol, isomalt, and other crystallizable polyols; sucrose may also be used. Furthermore the coating may include several opaque layers, such that the chewing gum composition is not visible through the coating itself, which can optionally be covered with a further one or more transparent layers for aesthetic, textural and protective purposes. The outer coating may also contain small amounts of water and gum arabic. The coating can be further coated with wax. The coating may be applied in a conventional manner by successive applications of a coating solution, with drying in between each coat. As the coating dries it usually becomes opaque and is usually white, though other colorants may be added. A polyol coating can be further coated with wax. The coating can further include colored flakes or speckles. If the composition comprises a coating, it is possible that one or more oral care actives can be dispersed throughout the coating. This is especially preferred if one or more oral care actives is incompatible in a single phase composition with another of the actives. Flavors may also be added to yield unique product characteristics.

In some embodiments, the coating may also be formulated to assist with increasing the thermal stability of the gum piece and preventing leaking of the liquid fill. In some embodiments, the coating may include a gelatin composition. The gelatin composition may be added as a 40% by weight solution and may be present in the coating composition from about 5% to about 10% by weight of the coating composition, and more specifically about 7% to about 8%. The gel strength of the gelatin may be from about 130 bloom to about 250 bloom.

Other materials may be added to the coating to achieve desired properties. These materials may include without limitation, cellulosics such as carboxymethyl cellulose, gelatin, pullulan, alginate, starch, carrageenan, xanthan gum, gum arabic and polyvinyl acetate (PVA).

The coating composition may also include a pre-coating which is added to the individual gum pieces prior to an optional hard coating. The pre-coating may include an application of polyvinyl acetate (PVA). This may be applied as a solution of PVA in a solvent, such as ethyl alcohol. When an outer hard coating is desired, the PVA application may be approximately 3% to 4% by weight of the total coating or about 1% of the total weight of the gum piece (including a first region composition, second region and hard coating).

Various other coating compositions and methods of making are also contemplated including but not limited to soft panning, dual or multiple extrusion, lamination, etc. Thus, in some embodiments, the coating can be amorphous or crystalline and the resulting texture can be hard, crunchy, crispy, soft, or chewy.

Additional Components

Additional additives, such as warming agents, cooling agents, tingling agents, flavors, sweeteners, sour tastes, bitter tastes, salty tastes, surfactants, breath freshening agents, anti-microbial agents, anti-bacterial agents, anti-calculus agents, antiplaque agents, fluoride compounds, remineralization agents, pharmaceuticals, micronutrients, throat care actives, tooth whitening agents, energy boosting agents, concentration boosting agents, appetite suppressants, colors and other actives may also be included in any or all portions or regions of the chewing gum composition. Such components may be used in amounts sufficient to achieve their intended effects.

Any of the additional components discussed herein may be added to any region of the multi-region chewing gum composition in their modified release form and/or without modified release (sometimes referred to as "free" components). In some embodiments, for instance, a single component may be added to the first region composition in its modified release form and free form. The modified release component and free component may be included together in the same region of the multi-region composition or, in some embodiments, the two components may be included in different regions of the composition.

In some other embodiments, for instance, two different components that provide the same functionality, e.g., two different flavors, sweeteners, tastes, sensations, or the like, may be included in a multi-region chewing gum composition. In some embodiments, both components may have modified release properties. Alternatively, in some embodiments, one of the components may be modified release, whereas the other component may be free. The two components may be included in the same or different regions of the multi-region composition.

Types of individual ingredients for which optional managed release from a chewing gum composition may be desired, include, but are not limited to sweeteners, flavors, actives, effervescing ingredients, appetite suppressors, breath fresheners, dental care ingredients, emulsifiers, flavor potentiators, bitterness masking or blocking ingredients, food acids, micronutrients, sensates, mouth moistening ingredients, throat care ingredients, colors, sour agents, bitter agents, salty agents, pharmaceuticals, energy boosting agents, concentration boosting agents and combinations thereof. Ingredients may be available in different forms such as, for example, liquid form, spray-dried form, or crystalline form. In some embodiments, chewing gum composition may include the same type of ingredient in different forms. For example, a chewing gum composition may include a liquid flavor and a spray-dried version of the same flavor. In some embodiments, the ingredient may be in its free or encapsulated form and may be present in any region of the gum composition such as in the first region composition, the second region, or the coating.

In some embodiments, an ingredient's release is modified such that when a consumer chews the chewing gum, they may experience an increase in the duration of flavor or sweetness perception and/or the ingredient is released or otherwise made available over a longer period of time. Modified release may be accomplished by any method known in the art, such as by encapsulation. Where modified release is due to encapsulation, this may be accomplished by a variety of means such as by spray coating or extrusion.

Additionally, if early and extended release of the ingredient is desired, the chewing gum composition may include ingredients without modified release (sometimes referred to as "free" ingredients), as well as ingredients with modified release. In some embodiments, a free ingredient may be used to deliver an initial amount or "hit" of an ingredient (e.g., flavor, cooling agent) or an initial sensation or benefit caused by the ingredient (e.g., flavor, nasal action, cooling, warming, tingling, saliva generation, breath freshening, teeth whitening, throat soothing, mouth moistening, etc.). In some embodiments, the same ingredient can be provided with modified release characteristics to provide an additional or delayed amount of the same sensation or benefit. By using both the free ingredient and the ingredient with modified release characteristics, the sensation or benefit due to the ingredient may be provided over a longer period of time and/or perception of the sensation or benefit by a consumer may be improved. Also, in some embodiments the initial amount or "hit" of the ingredient may predispose or precondition the consumers' mouth or perception of the chewing gum composition.

As another example, in some embodiments it may be desirable to provide a sustained release of an ingredient in a chewing gum composition over time. To accomplish sustained release, the ingredient may be modified to allow for a lower concentration of the ingredient to be released over a longer period of time versus the release of a higher concentration of the ingredient over a shorter period of time. A sustained release of an ingredient may be advantageous in situations when the ingredient has a bitter or other bad taste at the higher concentrations. A sustained release of an ingredient also may be advantageous when release of the ingredient in higher concentrations over a shorter period of time may result in a lesser amount of the ingredient being optimally delivered to the consumer. For example, for a tooth whitening or breath freshening ingredient, providing too much of the ingredient too fast may result in a consumer swallowing a significant portion of the ingredient before the ingredient has had a chance to interact with the consumer's teeth, mucous membranes, and/or dental work, thereby wasting the ingredient or at least reducing the benefit of having the ingredient in the chewing gum composition.

In some embodiments described herein, the second region of the chewing gum composition may include at least one modified release component. At least one modified release component optionally may be added to the first region composition and/or coating, as well. The additional modified release component that may be included in the first region composition and/or coating may be the same as or different from the modified release component contained in the second region.

Flavorants

In some embodiments, flavorants may include those flavors known to the skilled artisan, such as natural and artificial flavors. These flavorings may be chosen from synthetic flavor oils and flavoring aromatics and/or oils, oleoresins and extracts derived from plants, leaves, flowers, fruits, and so forth, and combinations thereof. Nonlimiting representative flavor oils include spearmint oil, cinnamon oil, oil of wintergreen (methyl salicylate), peppermint oil, Japanese mint oil, clove oil, bay oil, anise oil, eucalyptus oil, thyme oil, cedar leaf oil, oil of nutmeg, allspice, oil of sage, mace, oil of bitter almonds, and cassia oil. Also useful flavorings are artificial, natural and synthetic fruit flavors such as vanilla, and citrus oils including lemon, orange, lime, grapefruit, yazu, sudachi, and fruit essences including apple, pear, peach, grape, blueberry, strawberry, raspberry, cherry, plum, pineapple, apricot, banana, melon, apricot, ume, cherry, raspberry, blackberry, tropical fruit, mango, mangosteen, pomegranate, papaya and so forth. Other potential flavors whose release profiles can be managed include a milk flavor, a butter flavor, a cheese flavor, a cream flavor, and a yogurt flavor; a vanilla flavor; tea or coffee flavors, such as a green tea flavor, a oolong tea flavor, a tea flavor, a cocoa flavor, a chocolate flavor, and a coffee flavor; mint flavors, such as a peppermint flavor, a spearmint flavor, and a Japanese mint flavor; spicy flavors, such as an asafetida flavor, an ajowan flavor, an anise flavor, an angelica flavor, a fennel flavor, an allspice flavor, a cinnamon flavor, a camomile flavor, a mustard flavor, a cardamom flavor, a caraway flavor, a cumin flavor, a clove flavor, a pepper flavor, a coriander flavor, a sassafras flavor, a savory flavor, a Zanthoxyli Fructus flavor, a perilla flavor, a juniper berry flavor, a ginger flavor, a star anise flavor, a horseradish flavor, a thyme flavor, a tarragon flavor, a dill flavor, a capsicum flavor, a nutmeg flavor, a basil flavor, a marjoram flavor, a rosemary flavor, a bayleaf flavor, and a wasabi (Japanese horseradish) flavor; alcoholic flavors, such as a wine flavor, a whisky flavor, a brandy flavor, a rum flavor, a gin flavor, and a liqueur flavor; floral flavors; and vegetable flavors, such as an onion flavor, a garlic flavor, a cabbage flavor, a carrot flavor, a celery flavor, mushroom flavor, and a tomato flavor. These flavoring agents may be used in liquid or solid form and may be used individually or in admixture. Commonly used flavors include mints such as peppermint, menthol, spearmint, artificial vanilla, cinnamon derivatives, and various fruit flavors, whether employed individually or in admixture. Flavors may also provide breath freshening properties, particularly the mint flavors when used in combination with the cooling agents, described herein below.

In some embodiments, other flavorings include aldehydes and esters such as cinnamyl acetate, cinnamaldehyde, citral diethylacetal, dihydrocarvyl acetate, eugenyl formate, p-methylamisol, and so forth may be used. Generally any flavoring or food additive such as those described in Chemicals Used in Food Processing, publication 1274, pages 63-258, by the National Academy of Sciences, may be used. This publication is incorporated herein by reference. These may include natural as well as synthetic flavors.

Further examples of aldehyde flavorings include but are not limited to acetaldehyde (apple), benzaldehyde (cherry, almond), anisic aldehyde (licorice, anise), cinnamic aldehyde (cinnamon), citral, i.e., alpha-citral (lemon, lime), neral, i.e., beta-citral (lemon, lime), decanal (orange, lemon), ethyl vanillin (vanilla, cream), heliotrope, i.e., piperonal (vanilla, cream), vanillin (vanilla, cream), alpha-amyl cinnamaldehyde (spicy fruity flavors), butyraldehyde (butter, cheese), valeraldehyde (butter, cheese), citronellal (modifies, many types), decanal (citrus fruits), aldehyde C-8 (citrus fruits), aldehyde C-9 (citrus fruits), aldehyde C-12 (citrus fruits), 2-ethyl butyraldehyde (berry fruits), hexenal, i.e., trans-2 (berry fruits), tolyl aldehyde (cherry, almond), veratraldehyde (vanilla), 2,6-dimethyl-5-heptenal, .e., melonal (melon), 2,6-dimethyloctanal (green fruit), and 2-dodecenal (citrus, mandarin), cherry, grape, blueberry, blackberry, strawberry shortcake, and mixtures thereof.

In some embodiments, flavoring agents are used at levels that provide a perceptible sensory experience i.e. at or above their threshold levels. In other embodiments, flavoring agents are used at levels below their threshold levels such that they do not provide an independent perceptible sensory experience. At subthreshold levels, the flavoring agents may provide an ancillary benefit such as flavor enhancement or potentiation.

In some embodiments, a flavoring agent may be employed in either liquid form and/or dried form. When employed in the latter form, suitable drying means such as spray drying the liquid may be used. Alternatively, the flavoring agent may be absorbed onto water soluble materials, such as cellulose, starch, sugar, maltodextrin, gum arabic and so forth or may be encapsulated. In still other embodiments, the flavoring agent may be adsorbed onto silicas, zeolites, and the like.

In some embodiments, the flavoring agents may be used in many distinct physical forms. Without being limited thereto, such physical forms include free forms, such as spray dried, powdered, beaded forms, encapsulated forms, and mixtures thereof.

Illustrations of the encapsulation of flavors as well as other additional components can be found in the examples provided herein. Typically, encapsulation of a component will result in a delay in the release of the predominant amount of the component during consumption of a confectionery composition that includes the encapsulated component (e.g., as part of a delivery system added as an ingredient to the chewing confectionery composition). In some embodiments, the release profile of the ingredient (e.g., the flavor, sweetener, etc.) can be managed by managing various characteristics of the ingredient, delivery system containing the ingredient, and/or the confectionery composition containing the delivery system and/or how the delivery system is made. For example, characteristics might include one or more of the following: tensile strength of the delivery system, water solubility of the ingredient, water solubility of the encapsulating material, water solubility of the delivery system, ratio of ingredient to encapsulating material in the delivery system, average or maximum particle size of ingredient, average or maximum particle size of ground delivery system, the amount of the ingredient or the delivery system in the confectionery composition, ratio of different polymers used to encapsulate one or more ingredients, hydrophobicity of one or more polymers used to encapsulate one or more ingredients, hydrophobicity of the delivery system, the type or amount of coating on the delivery system, the type or amount of coating on an ingredient prior to the ingredient being encapsulated, etc.

Sweetening Ingredients

Sweeteners can include sugars, sugarless bulk sweeteners, or the like, high intensity sweeteners, or mixtures thereof. Bulk sweeteners generally are present in amounts of about 5% to about 99% by weight of the confectionery or chewing gum base composition. Suitable sugar sweeteners generally include mono-saccharides, di-saccharides and poly-saccharides such as but not limited to, sucrose (sugar), dextrose, maltose, dextrin, xylose, ribose, glucose, mannose, galactose, fructose (levulose), invert sugar, sucromalt, corn syrups, maltodextrins, oligo saccharide syrups, fructo oligo saccharide syrups, partially hydrolyzed starch, corn syrup solids, resistant starches, and mixtures thereof.

Suitable sugarless bulk sweeteners include sugar alcohols (or polyols) such as, but not limited to, sorbitol, xylitol, mannitol, galactitol, maltitol, hydrogenated isomaltulose (ISOMALT), lactitol, erythritol, hydrogenated starch hydrolysates, and mixtures thereof.

Suitable hydrogenated starch hydrolysates include those disclosed in U.S. Pat. No. 4,279,931 and various hydrogenated glucose syrups and/or powders which contain sorbitol, hydrogenated disaccharides, hydrogenated higher polysaccharides, or mixtures thereof. Hydrogenated starch hydrolysates are primarily prepared by the controlled catalytic hydrogenation of corn syrups. The resulting hydrogenated starch hydrolysates are mixtures of monomeric, dimeric, and polymeric saccharides. The ratios of these different saccharides give different hydrogenated starch hydrolysates different properties. Mixtures of hydrogenated starch hydrolysates, such as LYCASIN®, a commercially available product manufactured by Roquette Freres of France, and HYSTAR®, a commercially available product manufactured by SPI Polyols, Inc. of New Castle, Del., are also useful.

In some embodiments, high-intensity sweeteners also may be included as sweetening agents in the compositions. Without being limited to particular sweeteners, representative categories and examples include:

(a) water-soluble sweetening agents such as dihydrochalcones, monellin, steviosides, lo han quo, glycyrrhizin, dihydroflavenol, and sugar alcohols such as sorbitol, mannitol, maltitol, xylitol, erythritol, and L-aminodicarboxylic acid aminoalkenoic acid ester amides, such as those disclosed in U.S. Pat. No. 4,619,834, which disclosure is incorporated herein by reference, and mixtures thereof;

(b) water-soluble artificial sweeteners such as soluble saccharin salts, i.e., sodium or calcium saccharin salts, cyclamate salts, the sodium, ammonium or calcium salt of 3,4-dihydro-6-methyl-1,2,3-oxathiazine-4-one-2,2-dioxide, the potassium salt of 3,4-dihydro-6-methyl-1,2,3-oxathiazine-4-one-2,2-dioxide (Acesulfame-K), the free acid form of saccharin, and mixtures thereof;

(c) dipeptide based sweeteners, such as L-aspartic acid derived sweeteners, such as L-aspartyl-L-phenylalanine methyl ester (Aspartame), N—[N-(3,3-dimethylbutyl)-L-α-aspartyl]-L-phenylalanine 1-methyl ester (Neotame), and materials described in U.S. Pat. No. 3,492,131, L-alphaaspartyl-N-(2,2,4,4-tetramethyl-3-thietanyl)-D-alaninamide hydrate (Alitame), methyl esters of L-aspartyl-L-phenylglycerine and L-aspartyl-L-2,5-dihydrophenyl-glycine, L-aspartyl-2,5-dihydro-L-phenylalanine; L-aspartyl-L-(1-cyclohexen)-alanine, and mixtures thereof;

(d) water-soluble sweeteners derived from naturally occurring water-soluble sweeteners, such as chlorinated derivatives of ordinary sugar (sucrose), e.g., chlorodeoxysugar derivatives such as derivatives of chlorodeoxysucrose or chlorodeoxygalactosucrose, known, for example, under the product designation of Sucralose or Splenda™; examples of chlorodeoxysucrose and chlorodeoxygalactosucrose derivatives include but are not limited to: 1-chloro-1'-deoxysucrose; 4-chloro-4-deoxy-alpha-D-galactopyranosyl-alpha-D-fructofuranoside, or 4-chloro-4-deoxygalactosucrose; 4-chloro-4-deoxy-alpha-D-galactopyranosyl-1-chloro-1-deoxy-beta-D-fructo-f uranoside, or 4,1'-dichloro-4,1'-dideoxygalactosucrose; 1',6'-dichloro1',6'-dideoxysucrose; 4-chloro-4-deoxy-alpha-D-galactopyranosyl-1,6-dichloro-1,6-dideoxy-beta-D-fructofuranoside, or 4,1',6'-trichloro-4,1',6'-trideoxygalactosucrose; 4,6-dichloro-4,6-dideoxy-alpha-D-galactopyranosyl-6-chloro-6-deoxy-beta-D-fructofuranoside, or 4,6,6'-trichloro-4,6,6'-trideoxygalactosucrose; 6,1',6'-trichloro-6,1',6'-trideoxysucrose; 4,6-dichloro-4,6-dideoxy-alpha-D-galactopyranosyl-1,6-dichloro-1,6-dideoxy-beta-D-fructofuranoside, or 4,6,1',6'-tetrachloro4,6,1',6'-tetradeoxygalacto-sucrose; and 4,6,1',6'-tetradeoxy-sucrose, and mixtures thereof;

(e) protein based sweeteners such as thaumaoccous danielli (Thaumatin I and II) and talin;

(f) the sweetener monatin (2-hydroxy-2-(indol-3-ylmethyl)-4-aminoglutaric acid) and its derivatives; and (g) the sweetener Lo han guo (sometimes also referred to as "Lo han kuo").

The intense sweetening agents may be used in many distinct physical forms well-known in the art to provide an initial burst of sweetness and/or a prolonged sensation of sweetness. Without being limited thereto, such physical forms include free forms, spray dried forms, powdered forms, beaded forms, encapsulated forms, and mixtures thereof. In one embodiment, the sweetener is a high intensity sweetener such as aspartame, sucralose, and acesulfame potassium (e.g., Ace-K or acesulfame-K).

In some embodiments, the sweetener may be a polyol. Polyols can include, but are not limited to glycerol, sorbitol, maltitol, maltitol syrup, mannitol, isomalt, erythritol, xylitol, hydrogenated starch hydrolysates, polyglycitol syrups, polyglycitol powders, lactitol, and combinations thereof.

The active component (e.g., sweetener), which is part of the delivery system, may be used in amounts necessary to impart the desired effect associated with use of the active component (e.g., sweetness). In general, an effective amount of intense sweetener may be utilized to provide the level of sweetness desired, and this amount may vary with the sweetener selected. The intense sweetener may be present in amounts from about 0.001% to about 3%, by weight of the composition, depending upon the sweetener or combination of sweeteners used. The exact range of amounts for each type of sweetener may be selected by those skilled in the art.

Sensate Ingredients

Sensate compounds can include cooling agents, warming agents, tingling agents, effervescent agents, and combinations thereof. A variety of well known cooling agents may be employed. For example, among the useful cooling agents are included xylitol, erythritol, dextrose, sorbitol, menthane, menthone, ketals, menthone ketals, menthone glycerol ketals, substituted p-menthanes, acyclic carboxamides, mono menthyl glutarate, substituted cyclohexanamides, substituted cyclohexane carboxamides, substituted ureas and sulfonamides, substituted menthanols, hydroxymethyl and hydroxymethyl derivatives of p-menthane, 2-mercapto-cyclo-decanone, hydroxycarboxylic acids with 2-6 carbon atoms, cyclohexanamides, menthyl acetate, menthyl salicylate, N,2,3-trimethyl-2-isopropyl butanamide (WS-23), N-ethyl-p-menthane-3-carboxamide (WS-3), ethyl ester of N-[[5-methyl-2-(1-methylethyl)cyclohexyl]carbonyl]glycine (WS5), as well as the substantially pure ethyl ester of N-[[5-methyl-2-(1-methylethyl)cyclohexyl]carbonyl]glycine as disclosed in U.S. Pat. No. 7,189760 to Erman, et al which is incorporated in its entirety herein by reference, isopulegol, menthyloxy propane diol, 3-(1-menthoxy)propane-1,2-diol, 3-(1-menthoxy)-2-methylpropane-1,2-diol, p-menthane-2,3-diol, p-menthane-3,8-diol, 6-isopropyl-9-methyl-1,4-dioxaspiro[4,5]decane-2-methanol, menthyl succinate and its alkaline earth metal salts, trimethylcyclohexanol, N-ethyl-2-isopropyl-5-methylcyclohexanecarboxamide, Japanese mint oil, peppermint oil, 3-(1-menthoxy) ethan-1-ol, 3-(1-menthoxy)propan-1-ol, 3-(1-menthoxy)

butan-1-ol, 1-menthylacetic acid N-ethylamide, l-menthyl-4-hydroxypentanoate, 1-menthyl-3-hydroxybutyrate, N,2,3-trimethyl-2-(1-methylethyl)-butanamide, n-ethyl-t-2-c-6 nonadienamide, N,N-dimethyl menthyl succinamide, substituted p-menthanes, substituted p-menthane-carboxamides, 2-isopropanyl-5-methylcyclohexanol (from Hisamitsu Pharmaceuticals, hereinafter "isopregol"); menthone glycerol ketals (FEMA 3807, tradename FRESCOLAT® type MGA); 3-1-menthoxypropane-1,2-diol (from Takasago, FEMA 3784); and menthyl lactate; (from Haarman & Reimer, FEMA 3748, tradename FRESCOLAT® type ML), WS-30, WS-14, Eucalyptus extract (p-Mehtha-3,8-Diol), Menthol (its natural or synthetic derivatives), Menthol PG carbonate, Menthol EG carbonate, Menthol glyceryl ether, N-tertbutyl-p-menthane-3-carboxamide, P-menthane-3-carboxylic acid glycerol ester, Methyl-2-isopryl-bicyclo (2.2.1), Heptane-2-carboxamide; Menthol methyl ether, menthyl pyrrolidone carboxylate; 2,5-dimethyl-4-(1-pyrrolidinyl)-3(2H)-furanone; cyclic α-keto enamines, cyclotene derivatives such as cyclopentenes including 3-methyl-2-(1-pyrrolidinyl)-2-cyclopenten-1-one and 5-methyl-2-(1-pyrrolidinyl)-2-cyclopenten-1-one, compounds of the formula:

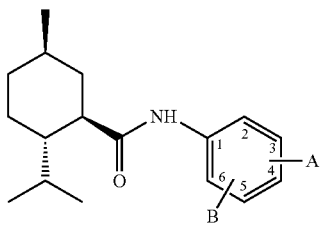

wherein B is selected from H, CH3, C2H5, OCH3, 0C2H5; and OH; and wherein A is a moiety of the formula-CO-D, wherein D is selected from the following moieties: (i) —NR1R2, wherein R' and R2 are independently selected from H and C 1-C8 straight or branched-chain aliphatic, alkoxyalkyl, hydroxyalkyl, araliphatic and cycloalkyl groups, or R1 and R2 together with the nitrogen atom to which they are attached form part of an optionally-substituted, five- or six-membered heterocyclic ring; (ii) —NIICH2COOCH2CH3, —NHCH2CONH2, —NHCH2CH2OCH3, —NHCH2CH2OH, —NHCH2CH (OH)CH2OH and (iii) a moiety selected from the group consisting of:

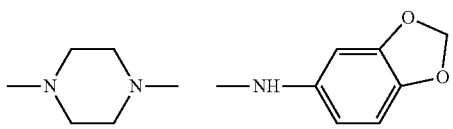

as disclosed in PCT Patent Application WO2006/125334 to Bell et al which is incorporated in its entirety herein by reference, among others. Other compounds include the alpha-keto enamines disclosed in U.S. Pat. No. 6,592,884 to Hofmann et al which is incorporated in its entirety herein by reference. These and other suitable cooling agents are further described in the following U.S. patents, all of which are incorporated in their entirety by reference hereto: U.S. Pat. Nos. 4,230,688; 4,032,661; 4,459,425; 4,178,459; 4,296,255; 4,136,163; 5,009,893; 5,266,592; 5,698,181; 6,277,385; 6,627,233; 7,030,273. Still other suitable cooling agents are further described in the following U.S. patent applications, all of which are incorporated in their entirety by reference hereto: U.S. 2005/0222256; 2005/0265930.

In some embodiments, warming components may be selected from a wide variety of compounds known to provide the sensory signal of warming to the user. These compounds offer the perceived sensation of warmth, particularly in the oral cavity, and often enhance the perception of flavors, sweeteners and other organoleptic components. In some embodiments, useful warming compounds can include vanillyl alcohol n-butylether (TK-1000) supplied by Takasago Perfumary Company Limited, Tokyo, Japan, vanillyl alcohol n-propylether, vanillyl alcohol isopropylether, vanillyl alcohol isobutylether, vanillyl alcohol n-aminoether, vanillyl alcohol isoamyleather, vanillyl alcohol n-hexyleather, vanillyl alcohol methylether, vanillyl alcohol ethylether, gingerol, shogaol, paradol, zingerone, capsaicin, dihydrocapsaicin, nordihydrocapsaicin, homocapsaicin, homodihydrocapsaicin, ethanol, isopropyl alcohol, iso-amylalcohol, benzyl alcohol, glycerine, and combinations thereof.

In some embodiments, a tingling sensation can be provided. One such tingling sensation is provided by adding jambu, oleoresin, or spilanthol to some examples. In some embodiments, alkylamides extracted from materials such as jambu or sanshool can be included. Additionally, in some embodiments, a sensation is created due to effervescence. Such effervescence is created by combining an alkaline material with an acidic material. In some embodiments, an alkaline material can include alkali metal carbonates, alkali metal bicarbonates, alkaline earth metal carbonates, alkaline earth metal bicarbonates and mixtures thereof. In some embodiments, an acidic material can include acetic acid, adipic acid, ascorbic acid, butyric acid, citric acid, formic acid, fumaric acid, glyconic acid, lactic acid, phosphoric acid, malic acid, oxalic acid, succinic acid, tartaric acid, aspartic acid, benzoic acid, caffeotannic acid, iso-citric acid, citramalic acid, galacturonic acid, glucuronic acid, glyceric acid, glycolic acid, ketoglutaric acid, a-ketoglutaric acid, lactoisocitric acid, oxalacetic acid, pyruvic acid, quinic acid, shikimic acid, succinic acid, tannic acid, hydroxyacetic acid, suberic acid, sebacic acid, azelaic acid, pimelic acid, capric acid, and combinations thereof. Examples of "tingling" type sensates can be found in U.S. Pat. No. 6,780,443, the entire contents of which are incorporated herein by reference for all purposes.

Sensate components may also be referred to as "trigeminal stimulants" such as those disclosed in U.S. Patent Application No. 2005/0202118, which is incorporated herein by reference. Trigeminal stimulants are defined as an orally consumed product or agent that stimulates the trigeminal nerve. Examples of cooling agents which are trigeminal stimulants include menthol, WS-3, N-substituted p-menthane carboxamide, acyclic carboxamides including WS-23, WS-5, WS-14, methyl succinate, and menthone glycerol ketals. Trigeminal stimulants can also include flavors, tingling agents, Jambu extract, vanillyl alkyl ethers, such as vanillyl n-butyl ether, spilanthol, Echinacea extract, Northern Prickly Ash extract, capsaicin, capsicum oleoresin, red pepper oleoresin, black pepper oleoresin, piperine, ginger oleoresin, gingerol, shoagol, cinnamon oleoresin, cassia oleoresin, cinnamic aldehyde, eugenol, cyclic acetal of vanillin and menthol glycerin ether, unsaturated amides, and combinations thereof. Other cooling compounds can include derivatives of 2,3-dimethyl-2-isopropylbutyric acid such as those disclosed in U.S. Pat. No. 7,030,273, which is incorporated herein by reference.

In addition to trigeminal nerve stimulants and cooling compounds, a cooling sensation can be provided by materials exhibiting a negative heat of solution including, but not limited to, polyols such as xylitol, erythritol, dextrose, and sorbitol, and combinations thereof.

In some embodiments, sensate components are used at levels that provide a perceptible sensory experience i.e. at or above their threshold levels. In other embodiments, sensate components are used at levels below their threshold levels such that they do not provide an independent perceptible sensory experience. At subthreshold levels, the sensates may provide an ancillary benefit such as flavor or sweetness enhancement or potentiation.

Breath Freshening Ingredients

Breath fresheners can include essential oils as well as various aldehydes, alcohols, and similar materials. In some embodiments, essential oils can include oils of spearmint, peppermint, wintergreen, sassafras, chlorophyll, citral, geraniol, cardamom, clove, sage, carvacrol, eucalyptus, cardamom, magnolia bark extract, marjoram, cinnamon, lemon, lime, grapefruit, and orange. In some embodiments, aldehydes such as cinnamic aldehyde and salicylaldehyde can be used. Additionally, chemicals such as menthol, carvone, iso-garrigol, and anethole can function as breath fresheners. Of these, the most commonly employed are oils of peppermint, spearmint and chlorophyll.

In addition to essential oils and chemicals derived from them, in some embodiments breath fresheners can include but are not limited to zinc citrate, zinc acetate, zinc fluoride, zinc ammonium sulfate, zinc bromide, zinc iodide, zinc chloride, zinc nitrate, zinc flurosilicate, zinc gluconate, zinc tartarate, zinc succinate, zinc formate, zinc chromate, zinc phenol sulfonate, zinc dithionate, zinc sulfate, silver nitrate, zinc salicylate, zinc glycerophosphate, copper nitrate, chlorophyll, copper chlorophyll, chlorophyllin, hydrogenated cottonseed oil, chlorine dioxide, beta cyclodextrin, zeolite, silica-based materials, carbon-based materials, enzymes such as laccase, and combinations thereof.

In some embodiments, the release profiles of probiotics can be managed for a confectionery including, but not limited to lactic acid producing microorganisms such as *Bacillus coagulans, Bacillus subtilis, Bacillus laterosporus, Bacillus laevolacticus, Sporolactobacillus inulinus, Lactobacillus acidophilus, Lactobacillus curvatus, Lactobacillus plantarum, Lactobacillus jenseni, Lactobacillus casei, Lactobacillus fermentum, Lactococcus lactis, Pedioccocus acidilacti, Pedioccocus pentosaceus, Pedioccocus urinae, Leuconostoc mesenteroides, Bacillus coagulans, Bacillus subtilis, Bacillus laterosporus, Bacillus laevolacticus, Sporolactobacillus inulinus* and mixtures thereof. Breath fresheners are also known by the following trade names: Retsyn,™ Actizol,™ and Nutrazin.™ Examples of malodor-controlling compositions are also included in U.S. Pat. No. 5,300,305 to Stapler et al. and in U.S. Patent Application Publication Nos. 2003/0215417 and 2004/0081713 which are incorporated in their entirety herein by reference for all purposes.

Dental Care Ingredients

Dental care ingredients (also known as oral care ingredients) may include but are not limited to tooth whiteners, stain removers, oral cleaning, bleaching agents, desensitizing agents, dental remineralization agents, antibacterial agents, anticaries agents, plaque acid buffering agents, surfactants and anticalculus agents. Non-limiting examples of such ingredients can include, hydrolytic agents including proteolytic enzymes, abrasives such as hydrated silica, calcium carbonate, sodium bicarbonate and alumina, other active stain-removing components such as surface-active agents, including, but not limited to anionic surfactants such as sodium stearate, sodium palminate, sulfated butyl oleate, sodium oleate, salts of fumaric acid, glycerol, hydroxylated lecithin, sodium lauryl sulfate and chelators such as polyphosphates, which are typically employed as tartar control ingredients. In some embodiments, dental care ingredients can also include tetrasodium pyrophosphate and sodium tri-polyphosphate, sodium bicarbonate, sodium acid pyrophosphate, sodium tripolyphosphate, xylitol, sodium hexametaphosphate.

In some embodiments, peroxides such as carbamide peroxide, calcium peroxide, magnesium peroxide, sodium peroxide, hydrogen peroxide, and peroxydiphospate are included. In some embodiments, potassium nitrate and potassium citrate are included. Other examples can include casein glycomacropeptide, calcium casein peptone-calcium phosphate, casein phosphopeptides, casein phosphopeptide-amorphous calcium phosphate (CPP-ACP), and amorphous calcium phosphate. Still other examples can include papaine, krillase, pepsin, trypsin, lysozyme, dextranase, mutanase, glycoamylase, amylase, glucose oxidase, and combinations thereof.

Further examples can include surfactants such as sodium stearate, sodium ricinoleate, and sodium lauryl sulfate surfactants for use in some embodiments to achieve increased prophylactic action and to render the dental care ingredients more cosmetically acceptable. Surfactants can preferably be detersive materials which impart to the composition detersive and foaming properties. Suitable examples of surfactants are water-soluble salts of higher fatty acid monoglyceride monosulfates, such as the sodium salt of the monosulfated monoglyceride of hydgrogenated coconut oil fatty acids, higher alkyl sulfates such as sodium lauryl sulfate, alkyl aryl sulfonates such as sodium dodecyl benzene sulfonate, higher alkyl sulfoacetates, sodium lauryl sulfoacetate, higher fatty acid esters of 1,2-dihydroxy propane sulfonate, and the substantially saturated higher aliphatic acyl amides of lower aliphatic amino carboxylic acid compounds, such as those having 12 to 16 carbons in the fatty acid, alkyl or acyl radicals, and the like. Examples of the last mentioned amides are N-lauroyl sarcosine, and the sodium, potassium, and ethanolamine salts of N-lauroyl, N-myristoyl, or N-palmitoyl sarcosine.

In addition to surfactants, dental care ingredients can include antibacterial agents such as, but not limited to, triclosan, chlorhexidine, zinc citrate, silver nitrate, copper, limonene, and cetyl pyridinium chloride. In some embodiments, additional anticaries agents can include fluoride ions or fluorine-providing components such as inorganic fluoride salts. In some embodiments, soluble alkali metal salts, for example, sodium fluoride, potassium fluoride, sodium fluorosilicate, ammonium fluorosilicate, sodium monofluorophosphate, as well as tin fluorides, such as stannous fluoride and stannous chloride can be included. In some embodiments, a fluorine-containing compound having a beneficial effect on the care and hygiene of the oral cavity, e.g., diminution of enamel solubility in acid and protection of the teeth against decay may also be included as an ingredient. Examples thereof include sodium fluoride, stannous fluoride, potassium fluoride, potassium stannous fluoride ($SnF_2$-KF), sodium hexafluorostannate, stannous chlorofluoride, sodium fluorozirconate, and sodium monofluorophosphate. In some embodiments, urea is included.

Further examples are included in the following U.S. patents and U.S. published patent applications, the contents of all of which are incorporated in their entirety herein by reference for all purposes: U.S. Pat. No. 5,227,154 to Reynolds, U.S. Pat. No. 5,378,131 to Greenberg, U.S. Pat. No. 6,846,500 to Luo et al., U.S. Pat. No. 6,733,818 to Luo et al., U.S. Pat. No. 6,696,044 to Luo et al., U.S. Pat. No. 6,685,916 to Holme et al., U.S. Pat. No. 6,485,739 to Luo et al., U.S. Pat. No. 6,479,071 to Holme et al., U.S. Pat. No. 6,471,945 to Luo et al., U.S. Patent Publication Nos. 20050025721 to Holme et al., 2005008732 to Gebreselassie et al., and 20040136928 to Holme et al.

Active Ingredients

Actives generally refer to those ingredients that are included in a delivery system and/or confectionery composition for the desired end benefit they provide to the user. In some embodiments, actives can include medicaments, nutrients, nutraceuticals, herbals, nutritional supplements, pharmaceuticals, drugs, and the like and combinations thereof.

Examples of useful drugs include ace-inhibitors, antianginal drugs, anti-arrhythmias, anti-asthmatics, anti-cholesterolemics, analgesics, anesthetics, anti-convulsants, anti-depressants, anti-diabetic agents, anti-diarrhea preparations, antidotes, anti-histamines, anti-hypertensive drugs, anti-inflammatory agents, anti-lipid agents, anti-manics, anti-nauseants, anti-stroke agents, anti-thyroid preparations, anti-tumor drugs, anti-viral agents, acne drugs, alkaloids, amino acid preparations, anti-tussives, anti-uricemic drugs, antiviral drugs, anabolic preparations, systemic and non-systemic anti-infective agents, anti-neoplastics, anti-parkinsonian agents, anti-rheumatic agents, appetite stimulants, biological response modifiers, blood modifiers, bone metabolism regulators, cardiovascular agents, central nervous system stimulates, cholinesterase inhibitors, contraceptives, decongestants, dietary supplements, dopamine receptor agonists, endometriosis management agents, enzymes, erectile dysfunction therapies such as sildenafil citrate, which is currently marketed as Viagra™, fertility agents, gastrointestinal agents, homeopathic remedies, hormones, hypercalcemia and hypocalcemia management agents, immunomodulators, immunosuppressives, migraine preparations, motion sickness treatments, muscle relaxants, obesity management agents, osteoporosis preparations, oxytocics, parasympatholytics, parasympathomimetics, prostaglandins, psychotherapeutic agents, respiratory agents, sedatives, smoking cessation aids such as bromocryptine or nicotine, sympatholytics, tremor preparations, urinary tract agents, vasodilators, laxatives, antacids, ion exchange resins, anti-pyretics, appetite suppressants, expectorants, anti-anxiety agents, anti-ulcer agents, anti-inflammatory substances, coronary dilators, cerebral dilators, peripheral vasodilators, psycho-tropics, stimulants, anti-hypertensive drugs, vasoconstrictors, migraine treatments, antibiotics, tranquilizers, anti-psychotics, anti-tumor drugs, anti-coagulants, anti-thrombotic drugs, hypnotics, anti-emetics, anti-nauseants, anti-convulsants, neuromuscular drugs, hyper- and hypo-glycemic agents, thyroid and anti-thyroid preparations, diuretics, anti-spasmodics, terine relaxants, anti-obesity drugs, erythropoietic drugs, anti-asthmatics, cough suppressants, mucolytics, DNA and genetic modifying drugs, and combinations thereof.

Examples of active ingredients contemplated for use in some embodiments can include antacids, H2-antagonists, and analgesics. For example, antacid dosages can be prepared using the ingredients calcium carbonate alone or in combination with magnesium hydroxide, and/or aluminum hydroxide. Moreover, antacids can be used in combination with H2-antagonists.

Analgesics include opiates and opiate derivatives, such as Oxycontin™ ibuprofen, aspirin, acetaminophen, and combinations thereof that may optionally include caffeine.

Other drug active ingredients for use in embodiments can include anti-diarrheals such as Immodium™ AD, anti-histamines, anti-tussives, decongestants, vitamins, and breath fresheners. Also contemplated for use herein are anxiolytics such as Xanax™; anti-psychotics such as Clozaril™ and Haldol™; non-steroidal anti-inflammatories (NSAID's) such as ibuprofen, naproxen sodium, Voltaren™ and Lodine™, anti-histamines such as Claritin™ Hismanal™, Relafen™, and Tavist™; anti-emetics such as Kytril™ and Cesamet™; bronchodilators such as Bentolin™, Proventil™; anti-depressants such as Prozac™, Zoloft™ and Paxil™; anti-migraines such as Imigra™, ACE-inhibitors such as Vasotec™, Capoten™ and Zestril™; anti-Alzheimer's agents, such as Nicergoline™; and CaH-antagonists such as Procardia™, Adalat™, and Calan™.

The popular H2-antagonists which are contemplated for use in the present invention include cimetidine, ranitidine hydrochloride, famotidine, nizatidien, ebrotidine, mifentidine, roxatidine, pisatidine and aceroxatidine.

Active antacid ingredients can include, but are not limited to, the following: aluminum hydroxide, dihydroxyaluminum aminoacetate, aminoacetic acid, aluminum phosphate, dihydroxyaluminum sodium carbonate, bicarbonate, bismuth aluminate, bismuth carbonate, bismuth subcarbonate, bismuth subgallate, bismuth subnitrate, bismuth subsilysilate, calcium carbonate, calcium phosphate, citrate ion (acid or salt), amino acetic acid, hydrate magnesium aluminate sulfate, magaldrate, magnesium aluminosilicate, magnesium carbonate, magnesium glycinate, magnesium hydroxide, magnesium oxide, magnesium trisilicate, milk solids, aluminum mono-ordibasic calcium phosphate, tricalcium phosphate, potassium bicarbonate, sodium tartrate, sodium bicarbonate, magnesium aluminosilicates, tartaric acids and salts.

A variety of nutritional supplements may also be used as active ingredients including virtually any vitamin or mineral. For example, vitamin A, vitamin C, vitamin D, vitamin E, vitamin K, vitamin $B_6$, vitamin $B_{12}$, thiamine, riboflavin, biotin, folic acid, niacin, pantothenic acid, sodium, potassium, calcium, magnesium, phosphorus, sulfur, chlorine, iron, copper, iodine, zinc, selenium, manganese, choline, chromium, molybdenum, fluorine, cobalt and combinations thereof, may be used.

Examples of nutritional supplements that can be used as active ingredients are set forth in U.S. Patent Application Publication Nos. 2003/0157213 A1, 2003/0206993 and 2003/0099741 A1 which are incorporated in their entirety herein by reference for all purposes.

Various herbals may also be used as active ingredients such as those with various medicinal or dietary supplement properties. Herbals are generally aromatic plants or plant parts and or extracts thereof that can be used medicinally or for flavoring. Suitable herbals can be used singly or in various mixtures. Commonly used herbs include *Echinacea*, Goldenseal, *Calendula*, Rosemary, Thyme, Kava Kava, Aloe, Blood Root, Grapefruit Seed Extract, Black Cohosh, Ginseng, Guarana, Cranberry, Gingko Biloba, St. John's Wort, Evening Primrose Oil, Yohimbe Bark, Green Tea, Ma Huang, Maca, Bilberry, Lutein, and combinations thereof.

Effervescing System Ingredients

An effervescent system may include one or more edible acids and one or more edible alkaline materials. The edible acid(s) and the edible alkaline material(s) may react together to generate effervescence.

In some embodiments, the alkaline material(s) may be selected from, but is not limited to, alkali metal carbonates, alkali metal bicarbonates, alkaline earth metal carbonates, alkaline earth metal bicarbonates, and combinations thereof. The edible acid(s) may be selected from, but is not limited to, citric acid, phosphoric acid, tartaric acid, malic acid, ascorbic acid, and combinations thereof. In some embodiments, an effervescing system may include one or more other ingredients such as, for example, carbon dioxide, oral care ingredients, flavorants, etc.

For examples of use of an effervescing system in a chewing confectionery, refer to U.S. Provisional Patent No. 60/618,222 filed Oct. 13, 2004, and entitled "Effervescent Pressed Confectionery Tablet Compositions," the contents of which are incorporated herein by reference for all purposes. Other examples can be found in U.S. Pat. No. 6,235,318, the contents of which are incorporated herein by reference for all purposes.

Appetite Suppressor Ingredients

Appetite suppressors can be ingredients such as fiber and protein that function to depress the desire to consume food. Appetite suppressors can also include benzphetamine, diethylpropion, mazindol, phendimetrazine, phentermine, hoodia (P57), Olibra,™ ephedra, caffeine and combinations thereof. Appetite suppressors are also known by the following trade names: Adipex,™ Adipost,™ Bontril™ PDM, Bontril™ Slow Release, Didrex,™ Fastin,™ Ionamin,™ Mazanor,™ Melfiat,™ Obenix,™ Phendiet,™ Phendiet-105,™ Phentercot,™ Phentride,™ Plegine,™ Prelu-2,™ Pro-Fast,™ PT 105,™ Sanorex,™ Tenuate,™ Sanorex,™ Tenuate,™ Tenuate Dospan,™ Tepanil Ten-Tab,™ Teramine,™ and Zantryl.™ These and other suitable appetite suppressors are further described in the following U.S. patents, all of which are incorporated in their entirety by reference hereto: U.S. Pat. No. 6,838,431 to Portman, U.S. Pat. No. 6,716,815 to Portman, U.S. Pat. No. 6,558,690 to Portman, U.S. Pat. No. 6,468,962 to Portman, U.S. Pat. No. 6,436,899 to Portman.

Potentiator Ingredients

Potentiators can consist of materials that may intensify, supplement, modify or enhance the taste and/or aroma perception of an original material without introducing a characteristic taste and/or aroma perception of their own. In some embodiments, potentiators designed to intensify, supplement, modify, or enhance the perception of flavor, sweetness, tartness, umami, kokumi, saltiness and combinations thereof can be included.

In some embodiments, examples of suitable potentiators, also known as taste potentiators include, but are not limited to, neohesperidin dihydrochalcone, optically active S-alkyl 2-methyl butane thioate compounds such as those disclosed in PCT Application Number WO 2007/032262 to Ogura et al, which is incorporated in its entirety herein by reference, chlorogenic acid, alapyridaine, cynarin, miraculin, glupyridaine, pyridinium-betain compounds, glutamates, such as monosodium glutamate and monopotassium glutamate, neotame, thaumatin, tagatose, trehalose, salts, such as sodium chloride, monoammonium glycyrrhizinate, vanilla extract (in ethyl alcohol), sugar acids, potassium chloride, sodium acid sulfate, hydrolyzed vegetable proteins, hydrolyzed animal proteins, yeast extracts, adenosine monophosphate (AMP), glutathione, nucleotides, such as inosine monophosphate, disodium inosinate, xanthosine monophosphate, guanylate monophosphate, alapyridaine (N-(1-carboxyethyl)-6-(hydroxymethyl)pyridinium-3-ol inner salt, compositions comprising 5'-nucleotides such as those disclosed in US 2006/0078972 to Noordam et al, which is incorporated in its entirety herein by reference, sugar beet extract (alcoholic extract), sugarcane leaf essence (alcoholic extract), curculin, strogin, mabinlin, gymnemic acid, hydroxybenzoic acids, 3-hydrobenzoic acid, 2,4-dihydrobenzoic acid, citrus aurantium, vanilla oleoresin, sugarcane leaf essence, maltol, ethyl maltol, vanillin, licorice glycyrrhizinates, compounds that respond to the TRPM5 ion channel that mediates taste receptors for sweet, bitter, and savory tastes as disclosed in U.S. Patent Application Number 2005/0019830 to Penner et al, which is incorporated in its entirety herein by reference, pyridinium betain compounds as disclosed in U.S. Pat. No. 7,175,872 to Hofmann et al, which is incorporated in its entirety herein by reference, compounds that respond to G-protein coupled receptors (T2Rs and T1Rs) and taste potentiator compositions that impart kokumi, as disclosed in U.S. Pat. No. 5,679,397 to Kuroda et al., which is incorporated in its entirety herein by reference. "Kokumi" refers to materials that impart "mouthfulness" and "good body".

Sweetener potentiators, which are a type of taste potentiator, enhance the taste of sweetness. In some embodiments, exemplary sweetener potentiators include, but are not limited to, monoammonium glycyrrhizinate, licorice glycyrrhizinates, citrus aurantium, alapyridaine, alapyridaine (N-(1-carboxyethyl)-6-(hydroxymethyl)pyridinium-3-ol) inner salt, miraculin, curculin, strogin, mabinlin, gymnemic acid, cynarin, glupyridaine, pyridinium-betain compounds, sugar beet extract, neotame, thaumatin, neohesperidin dihydrochalcone, hydroxybenzoic acids, tagatose, trehalose, gurmarin, extracts and derivatives of extracts from *Gymnema sylvestre*, tryptophan, maltol, ethyl maltol, vanilla extract, vanilla oleoresin, vanillin, sugar beet extract (alcoholic extract), sugarcane leaf essence (alcoholic extract), compounds that respond to G-protein coupled receptors (T2Rs and T1Rs), compounds that respond to the human T1R2 taste receptor, and combinations thereof.

Additional examples of potentiators for the enhancement of salt taste include acidic peptides, such as those disclosed in U.S. Pat. No. 6,974,597, herein incorporated by reference. Acidic peptides include peptides having a larger number of acidic amino acids, such as aspartic acid and glutamic acid, than basic amino acids, such as lysine, arginine and histidine. The acidic peptides are obtained by peptide synthesis or by subjecting proteins to hydrolysis using endopeptidase, and if necessary, to deamidation. Suitable proteins for use in the production of the acidic peptides or the peptides obtained by subjecting a protein to hydrolysis and deamidation include plant proteins, (e.g. wheat gluten, corn protein (e.g., zein and gluten meal), soybean protein isolate), animal proteins (e.g., milk proteins such as milk casein and milk whey protein, muscle proteins such as meat protein and fish meat protein, egg white protein and collagen), and microbial proteins (e.g., microbial cell protein and polypeptides produced by microorganisms).

The sensation of warming or cooling effects may also be prolonged with the use of a hydrophobic sweetener as described in U.S. Patent Application Publication 2003/0072842 A1 which is incorporated in its entirety herein by reference. For example, such hydrophobic sweeteners include those of the formulae I-XI as set forth below:

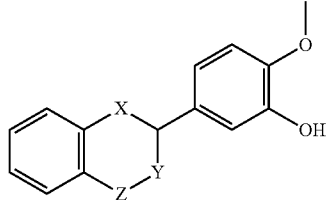
I wherein X, Y and Z are selected from the group consisting of $CH_2$, O and S;

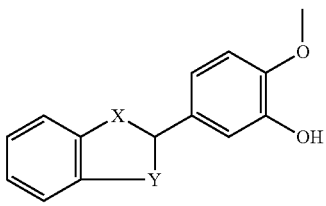
II wherein X and Y are selected from the group consisting of S and O;

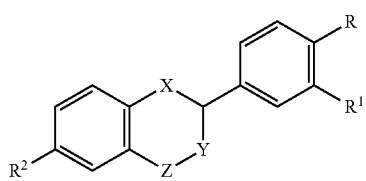
III wherein X is S or O; Y is O or $CH_2$; Z is $CH_2$, $SO_2$ or S; R is $OCH_3$, OH or H; $R^1$ is SH or OH and $R^2$ is H or OH;

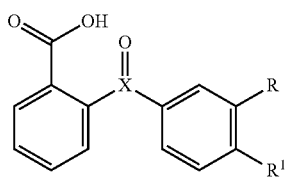
IV wherein X is C or S; R is OH or H and $R^1$ is $OCH_3$ or OH;

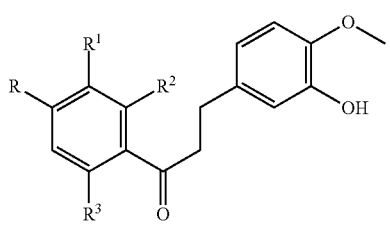
V wherein R, $R^2$ and $R^3$ are OH or H and $R^1$ is H or COOH;

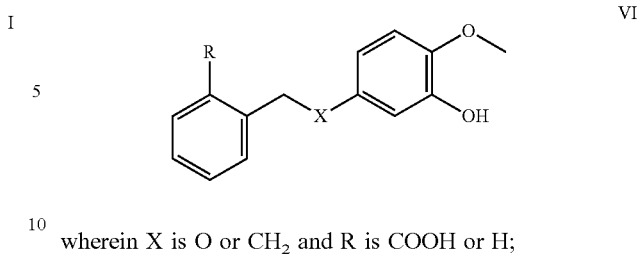
VI wherein X is O or $CH_2$ and R is COOH or H;

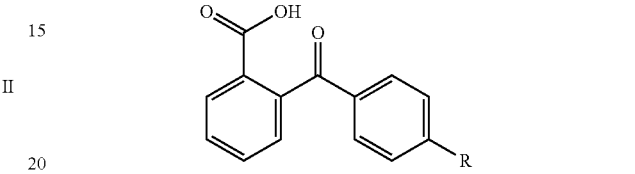
VII wherein R is $CH_3CH_2$, OH, $N(CH3)_2$ or Cl;

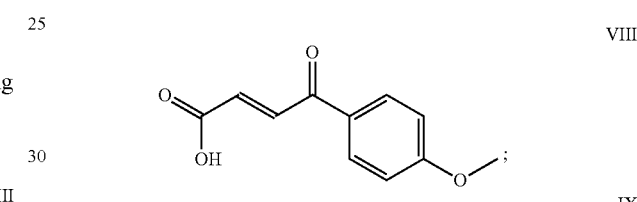
VIII

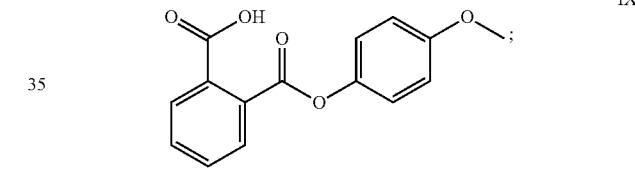
IX

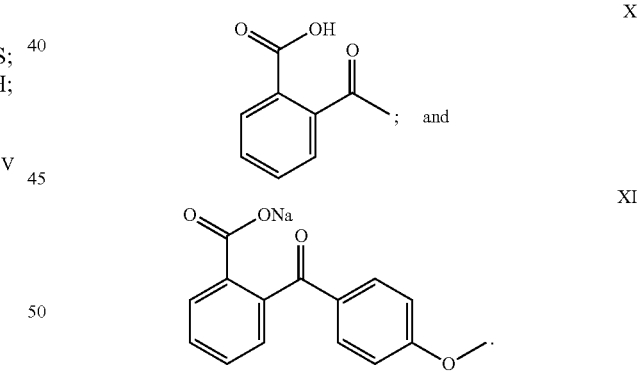
X ; and

XI

Perillartine may also be added as described in U.S. Pat. No. 6,159,509 also incorporated in its entirety herein by reference.

Food Acid Ingredients

Acids can include, but are not limited to acetic acid, adipic acid, ascorbic acid, butyric acid, citric acid, formic acid, fumaric acid, glyconic acid, lactic acid, phosphoric acid, malic acid, oxalic acid, succinic acid, tartaric acid, aspartic acid, benzoic acid, caffeotannic acid, iso-citric acid, citramalic acid, galacturonic acid, glucuronic acid, glyceric acid, glycolic acid, ketoglutaric acid, a-ketoglutaric acid, lactoisocitric acid, oxalacetic acid, pyruvic acid, quinic acid, shikimic acid, succinic acid, tannic acid, hydroxyacetic acid, suberic acid, sebacic acid, azelaic acid, pimelic acid, capric acid, and combinations thereof.

Micronutrient Ingredients

Micronutrients can include materials that have an impact on the nutritional well being of an organism even though the quantity required by the organism to have the desired effect is small relative to macronutrients such as protein, carbohydrate, and fat. Micronutrients can include, but are not limited to vitamins, minerals, enzymes, phytochemicals, antioxidants, and combinations thereof.

In some embodiments, vitamins can include fat soluble vitamins such as vitamin A, vitamin D, vitamin E, and vitamin K and combinations thereof. In some embodiments, vitamins can include water soluble vitamins such as vitamin C (ascorbic acid), the B vitamins (thiamine or $B_1$, riboflavoin or $B_2$, niacin or $B_3$, pyridoxine or $B_6$, folic acid or $B_9$, cyanocobalimin or $B_{12}$, pantothenic acid, biotin), and combinations thereof.

In some embodiments minerals can include but are not limited to sodium, magnesium, chromium, iodine, iron, manganese, calcium, copper, fluoride, potassium, phosphorous, molybdenum, selenium, zinc, and combinations thereof.

In some embodiments micronutrients can include but are not limited to L-carnitine, choline, coenzyme Q10, alpha-lipoic acid, omega-3-fatty acids, pepsin, phytase, trypsin, lipases, proteases, cellulases, and combinations thereof.

Antioxidants can include materials that scavenge free radicals. In some embodiments, antioxidants can include but are not limited to ascorbic acid, citric acid, rosemary oil, vitamin A, vitamin E, vitamin E phosphate, tocopherols, di-alpha-tocopheryl phosphate, tocotrienols, alpha lipoic acid, dihydrolipoic acid, xanthophylls, beta cryptoxanthin, lycopene, lutein, zeaxanthin, astaxanthin, beta-carotene, carotenes, mixed carotenoids, polyphenols, flavonoids, and combinations thereof.

In some embodiments phytochemicals can include but are not limited to cartotenoids, chlorophyll, chlorophyllin, fiber, flavanoids, anthocyanins, cyaniding, delphinidin, malvidin, pelargonidin, peonidin, petunidin, flavanols, catechin, epicatechin, epigallocatechin, epigallocatechingallate (EGCG), theaflavins, thearubigins, proanthocyanins, flavonols, quercetin, kaempferol, myricetin, isorhamnetin, flavononesheperetin, naringenin, eriodictyol, tangeretin, flavones, apigenin, luteolin, lignans, phytoestrogens, resveratrol, isoflavones, daidzein, genistein, glycitein, soy isoflavones, and combinations thereof.

Mouth Moistening Ingredients

Mouth moisteners can include, but are not limited to, saliva stimulators such as acids and salts and combinations thereof. In some embodiments, acids can include acetic acid, adipic acid, ascorbic acid, butyric acid, citric acid, formic acid, fumaric acid, glyconic acid, lactic acid, phosphoric acid, malic acid, oxalic acid, succinic acid, tartaric acid and combinations thereof.

Mouth moisteners can also include hydrocolloid materials that hydrate and may adhere to oral surface to provide a sensation of mouth moistening. Hydrocolloid materials can include naturally occurring materials such as plant exudates, seed gums, and seaweed extracts or they can be chemically modified materials such as cellulose, starch, or natural gum derivatives. In some embodiments, hydrocolloid materials can include pectin, gum arabic, acacia gum, alginates, agar, carageenans, guar gum, xanthan gum, locust bean gum, gelatin, gellan gum, cassia gum, galactomannans, tragacanth gum, karaya gum, curdlan, konjac, chitosan, xyloglucan, beta glucan, furcellaran, gum ghatti, tamarin, bacterial gums, and combinations thereof. Additionally, in some embodiments, modified natural gums such as propylene glycol alginate, carboxymethyl locust bean gum, low methoxyl pectin, and their combinations can be included. In some embodiments, modified celluloses can be included such as microcrystalline cellulose, carboxymethlcellulose (CMC), methylcellulose (MC), hydroxypropylmethylcellulose (HPCM), and hydroxypropylcellulose (MPC), and combinations thereof.

Similarly, humectants which can provide a perception of mouth hydration can be included. Such humectants can include, but are not limited to glycerol, sorbitol, polyethylene glycol, erythritol, and xylitol. Additionally, in some embodiments, fats can provide a perception of mouth moistening. Such fats can include medium chain triglycerides, vegetable oils, fish oils, mineral oils, and combinations thereof.

Mouth moisteners can also include pellitorine extracts, extracts of Anacyclus pyrethrum, trans-pellitorin, N-isobutyl-trans-2-trans-4-decadienamide, alkadienamides including N-isobutyl-E2, E4-decadienamide; N-isobutyl-E2,E4-undecadienamide; N-pyrollidyl-E2,E4-decadienamide; N-piperidyl-E2,E4-decadienamide, or combinations thereof as disclosed in U.S. Patent Application No. 2007/0075368 which is incorporated in its entirety herein by reference; blends of n-isobutyldeca-trans-2-trans-4-dienamide with food acids as disclosed in U.S. Patent Application No. 2006/0204551 which is incorporated in its entirety herein by reference; blends of compounds according to formula (I): wherein $R_1$ represents C1-C2 n-alkyl; $R_2$ is 2-methyl-1-propyl and $R_3$ is hydrogen, or $R_2$ and $R_3$ taken together is a moiety having the formula —$(CH_2)_n$— wherein n is 4 or 5, or mixtures thereof with cooling compounds as disclosed in U.S. Patent Application No. 2007/0036838 to Keenan et al, which is incorporated in its entirety herein by reference.

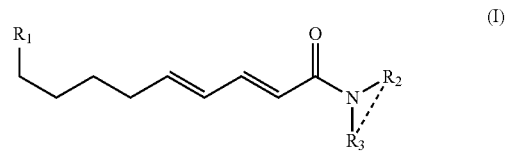

Throat Care Ingredients

Throat soothing ingredients can include analgesics, anesthetics, demulcents, antiseptic, and combinations thereof. In some embodiments, analgesics/anesthetics can include menthol, phenol, hexylresorcinol, benzocaine, dyclonine hydrochloride, benzyl alcohol, salicyl alcohol, and combinations thereof. In some embodiments, demulcents can include but are not limited to slippery elm bark, pectin, gelatin, and combinations thereof. In some embodiments, antiseptic ingredients can include cetylpyridinium chloride, domiphen bromide, dequalinium chloride, and combinations thereof.

In some embodiments, antitussive ingredients such as chlophedianol hydrochloride, codeine, codeine phosphate, codeine sulfate, dextromethorphan, dextromethorphan hydrobromide, diphenhydramine citrate, and diphenhydramine hydrochloride, and combinations thereof can be included.

In some embodiments, throat soothing agents such as honey, propolis, aloe vera, glycerine, menthol and combinations thereof can be included. In still other embodiments, cough suppressants can be included. Such cough suppressants can fall into two groups: those that alter the consistency or production of phlegm such as mucolytics and expectorants; and those that suppress the coughing reflex such as codeine (narcotic cough suppressants), antihistamines, dextromethorphan and isoproterenol (non-narcotic cough suppressants). In some embodiments, ingredients from either or both groups can be included.

In still other embodiments, antitussives can include, but are not limited to, the group consisting of codeine, dextromethorphan, dextrorphan, diphenhydramine, hydrocodone, noscapine, oxycodone, pentoxyverine and combinations thereof. In some embodiments, antihistamines can include, but are not limited to, acrivastine, azatadine, brompheniramine, chlorpheniramine, clemastine, cyproheptadine, dexbrompheniramine, dimenhydrinate, diphenhydramine, doxylamine, hydroxyzine, meclizine, phenindamine, phenyltoloxamine, promethazine, pyrilamine, tripelennamine, triprolidine and combinations thereof. In some embodiments, non-sedating antihistamines can include, but are not limited to, astemizole, cetirizine, ebastine, fexofenadine, loratidine, terfenadine, and combinations thereof.

In some embodiments, expectorants can include, but are not limited to, ammonium chloride, guaifenesin, ipecac fluid extract, potassium iodide and combinations thereof. In some embodiments, mucolytics can include, but are not limited to, acetylcycsteine, ambroxol, bromhexine and combinations thereof. In some embodiments, analgesic, antipyretic and anti-inflammatory agents can include, but are not limited to, acetaminophen, aspirin, diclofenac, diflunisal, etodolac, fenoprofen, flurbiprofen, ibuprofen, ketoprofen, ketorolac, nabumetone, naproxen, piroxicam, caffeine and mixtures thereof. In some embodiments, local anesthetics can include, but are not limited to, lidocaine, benzocaine, phenol, dyclonine, benzonotate and mixtures thereof.

In some embodiments nasal decongestants and ingredients that provide the perception of nasal clearing can be included. In some embodiments, nasal decongestants can include but are not limited to phenylpropanolamine, pseudoephedrine, ephedrine, phenylephrine, oxymetazoline, and combinations thereof. In some embodiments ingredients that provide a perception of nasal clearing can include but are not limited to menthol, camphor, borneol, ephedrine, eucalyptus oil, peppermint oil, methyl salicylate, bornyl acetate, lavender oil, wasabi extracts, horseradish extracts, and combinations thereof. In some embodiments, a perception of nasal clearing can be provided by odoriferous essential oils, extracts from woods, confectionerys, flowers and other botanicals, resins, animal secretions, and synthetic aromatic materials.

Coloring Ingredients

In some embodiments, one or more colors can be included. As classified by the United States Food, Drug, and Cosmetic Act (21 C.F.R. 73), colors can include exempt from certification colors (sometimes referred to as natural even though they can be synthetically manufactured) and certified colors (sometimes referred to as artificial), or combinations thereof. In some embodiments, exempt from certification or natural colors can include, but are not limited to annatto extract, (E160b), bixin, norbixin, astaxanthin, dehydrated beets (beet powder), beetroot red/betanin (E162), ultramarine blue, canthaxanthin (E161g), cryptoxanthin (E161c), rubixanthin (E161d), violanxanthin (E161e), rhodoxanthin (E161f), caramel (E150(a-d)), β-apo-8'-carotenal (E160e), β-carotene (E160a), alpha carotene, gamma carotene, ethyl ester of beta-apo-8 carotenal (E160f), flavoxanthin (E161a), lutein (E161b), cochineal extract (E120); carmine (E132), carmoisine/azorubine (E122), sodium copper chlorophyllin (E141), chlorophyll (E140), toasted partially defatted cooked cottonseed flour, ferrous gluconate, ferrous lactate, grape color extract, grape skin extract (enocianina), anthocyanins (E163), haematococcus algae meal, synthetic iron oxide, iron oxides and hydroxides (E172), fruit juice, vegetable juice, dried algae meal, tagetes (Aztec marigold) meal and extract, carrot oil, corn endosperm oil, paprika, paprika oleoresin, phaffia yeast, riboflavin (E101), saffron, titanium dioxide, turmeric (E100), turmeric oleoresin, amaranth (E123), capsanthin/capsorbin (E160c), lycopene (E160d), and combinations thereof.

In some embodiments, certified colors can include, but are not limited to, FD&C blue #1, FD&C blue #2, FD&C green #3, FD&C red #3, FD&C red #40, FD&C yellow #5 and FD&C yellow #6, tartrazine (E102), quinoline yellow (E104), sunset yellow (E110), ponceau (E124), erythrosine (E127), patent blue V (E131), titanium dioxide (E171), aluminium (E173), silver (E174), gold (E175), pigment rubine/lithol rubine BK (E180), calcium carbonate (E170), carbon black (E153), black PN/brilliant black BN (E151), green S/acid brilliant green BS (E142), and combinations thereof. In some embodiments, certified colors can include FD&C aluminum lakes. These consist of the aluminum salts of FD&C dyes extended on an insoluble substrate of alumina hydrate. Additionally, in some embodiments, certified colors can be included as calcium salts.

Multiple Agents

In some embodiments, a chewing gum composition may include two or more ingredients for which managed release from the chewing gum during consumption is desired. In some embodiments, the ingredients may be encapsulated or otherwise included separately in different delivery systems. Alternatively, in some embodiments the ingredients may be encapsulated or otherwise included in the same delivery system. As another possibility, one or more of the ingredients may be free (e.g., unencapsulated) while one or more other ingredients may be encapsulated.

A chewing gum composition may include a group of ingredients for which managed release of the group during consumption of the chewing gum composition is desired. Groups of two or more ingredients for which managed release from a chewing gum composition during consumption thereof may be desired include, but are not limited to: color and flavor, multiple flavors, multiple colors, cooling agent and flavor, warming agent and flavor, cooling agent and warming agent, cooling agent and high intensity sweetener, warming agent and high intensity sweetener, multiple cooling agents (e.g., WS-3 and WS-23, WS-3 and menthyl succinate), menthol and one or more cooling agents, menthol and one or more warming agents, multiple warming agents, high intensity sweetener(s) and tooth whitening active(s), high intensity sweetener(s) and breath freshening active(s), an ingredient with some bitterness and a bitterness suppressor for the ingredient, multiple high intensity sweeteners (e.g., ace-k and aspartame), multiple tooth whitening actives (e.g., an abrasive ingredient and an antimicrobial ingredient, a peroxide and a nitrate, a warming agent and a polyol, a cooling agent and a polyol, multiple polyols, a warming agent and micronutrient, a cooling agent and a micronutrient, a warming agent and a mouth moistening agent, a cooling agent and a mouth moistening agent, a warming agent and a throat care agent, a cooling agent and a throat care agent, a warming agent and a food acid, a cooling agent and food acid, a warming agent and an emulsifier/surfactant, a cooling agent and an emulsifier/surfactant, a warming agent and a color, a cooling agent and a color, a warming agent and a flavor potentiator, a cooling agent and a flavor potentiator, a warming agent with sweetness potentiator, a cooling agent with a sweetness potentiator, a warming agent and an appetite suppressant, a cooling agent and an appetite suppressant, a high intensity sweetener and a flavor, a cooling agent and a teeth whitening agent, a warming agent and a teeth whitening agent, a warming agent and breath freshening agent, a cooling agent and a breath freshening agent, a cooling agent and an effervescing system, a warming agent and an effervescing system, a warming agent and an antimicrobial agent, a cooling agent and an antimicrobial agent, multiple anticalculus ingredients, multiple remineralization ingredients, multiple surfactants, remineralization ingredients with demineralization ingredients, acidic ingredients with acid buffering ingredients, anticalculus ingredients with antibacterial ingredients, remineralization ingredients with anticalculus ingredients, anticalculus ingredients with remineralization ingredients with antibacterial ingredients, surfactant ingredients with anticalculus ingredients, surfactant ingredients with antibacterial ingredients, surfactant ingredients with remineralization ingredients, surfactants with anticalculus ingredients with antibacterial ingredients, multiple types of vitamins or minerals, multiple micronutrients, multiple acids, multiple antimicrobial ingredients, multiple breath freshening ingredients, breath freshening ingredients and antimicrobial ingredients, multiple appetite suppressors, acids and bases that react to effervesce, a bitter compound with a high intensity sweetener, a cooling agent and an appetite suppressant, a warming agent and an appetite suppressant, a high intensity sweetener and an appetite suppressant, a high intensity sweetener with an acid, a probiotic ingredient and a prebiotic ingredient, a vitamin and a mineral, a metabolic enhancement ingredient with a macronutrient, a metabolic enhancement ingredient with a micronutrient, an enzyme with a substrate, a high intensity sweetener with a sweetness potentiator, a cooling compound with a cooling potentiator, a flavor with a flavor potentiator, a warming compound with a warming potentiator, a flavor with salt, a high intensity sweetener with salt, an acid with salt, a cooling compound with salt, a warming compound with salt, a flavor with a surfactant, an astringent compound with an ingredient to provide a sensation of hydration, etc. In some embodiments, the multiple ingredients may be part of the same delivery system or may be part of different delivery systems. Different delivery systems may use the same or different encapsulating materials.

Typically, encapsulation of the multiple ingredients will result in a delay in the release of the predominant amount of the multiple ingredients during consumption of a chewing gum composition that includes the encapsulated multiple ingredients (e.g., as part of a delivery system added as an ingredient to the chewing gum). This may be particularly helpful in situations wherein separate encapsulation of the ingredients may cause them to release with different release profiles. For example, different high intensity sweeteners may have different release profiles because they have different water solubilities or differences in other characteristics. Encapsulating them together may cause them to release more simultaneously.

In some embodiments, the release profile of the multiple ingredients can be managed for a gum by managing various characteristics of the multiple ingredients, the delivery system containing the multiple ingredients, and/or the chewing gum containing the delivery system and/or how the delivery system is made in a manner as previously discussed above.

The additional components, as described above, may be used in one or more regions or layers of the gum composition, such as in the first region composition, the second region or the coating as desired.

The additional components may be added to one or more regions or layers of the multi-region gum in their encapsulated and/or unencapsulated forms, as well as in combination with any of the other optional components. For instance, a single component may be added to a multi-region gum in its encapsulated and unencapsulated forms. The two different forms of the component may be added to the same or different region of the multi-region gum in the same or different amounts.

In some embodiments, a single component may be added in two or more different encapsulated forms. In particular, two or more different encapsulating materials, such as different polymers, may be used to encapsulate two or more separate portions of the component. The different encapsulated forms of the same component may be added to the same or different region of the multi-region gum product in the same or different amounts. Further, in some embodiments, an unencapsulated form of the same component may be added in combination with the two or more different encapsulated forms. The unencapsulated form of the component may be added to any region of the multi-region gum product in the same or different amount from the encapsulated forms. Moreover, some embodiments may add an unencapsulated form of a similar component in combination with the two or more different encapsulated forms. For instance, two encapsulated forms of a single sweetener may be used in combination with an unencapsulated form of a different sweetener.

In some embodiments, combinations of two or more different components may be employed. In some embodiments, at least one of the different components may be encapsulated, while at least one of the other components of the combination may be unencapsulated. The multiple components may be of the same type, e.g., two different sweeteners. Alternatively, the multiple components may be from distinctly different categories, e.g., a sweetener and a warming agent. The different components may be added to the same or different regions of the multi-region gum in the same or different amounts. The amounts of the component in a particular region may be selected depending on how the components may be perceived by the consumer in the different regions, the sensory experience or functional benefit desired to give to the consumer, regulatory issues, resulting bad taste if too much is used in any one region, etc.

Some embodiments may include multiple components each of which is encapsulated. The multiple encapsulated components may be included in the same or different regions of the gum in the same or different amounts. The multiple encapsulated components may be the same type of component or from distinctly different categories.

In some embodiments in which multiple encapsulated components are added to the multi-region gum composition, the multiple components may be encapsulated together or separately. In embodiments in which the multiple components are encapsulated together, the components may be mixed together and encapsulated by a single encapsulating material. In embodiments in which the multiple components are encapsulated separately, the material used to encapsulate the components may be the same or different.

The features and advantages of the present invention are more fully shown by the following examples which are provided for purposes of illustration, and are not to be construed as limiting the invention in any way.

EXAMPLES

The following examples are directed to multi-region chewing gum compositions of some embodiments of the present invention. The second, or gum, region of the chewing gum compositions includes isomalt as described herein.

Examples A-H

Center-fill chewing gum pieces in the form of pellets including isomalt in the gum region were prepared in accordance with the formulations indicated in Tables 1 and 2 below.

TABLE 1

Gum Region Composition

| Component | % by Weight | | | | | | | |
|---|---|---|---|---|---|---|---|---|
| | A | B | C | D | E | F | G | H |
| Gum Base* | 28-42 | 28-42 | 28-42 | 28-42 | 28-42 | 28-42 | 28-42 | 28-42 |
| Lecithin | 0.6 | 0.5 | 0.55 | 0.05 | 0.4 | 0.6 | 0.55 | 0.35 |
| Isomalt | 50 | 39-49 | 30-55 | 40-52 | 20-60 | 40-60 | 20-40 | 37-52 |
| Sorbitol | 0 | 0-10 | 0-20 | 5-10 | 20-60 | 0-5 | 20-40 | 0-5 |
| Glycerin | 0 | 0 | 0 | 0 | 0-5 | 0-5 | 0-3 | 5-10 |
| Maltitol Syrup (Lycasin ®) | 5 | 6 | 4 | 3 | 0-8 | 0-8 | 0-10 | 3-10 |
| Flavors | 2.5 | 2.5 | 2 | 2.5 | 3 | 3 | 2.8 | 2-3 |
| Cooling Agent | 0.05 | 0.08 | 0.08 | 0 | 0.17 | 0.07 | 0.1 | 0-0.08 |
| Acidulants | 0-2 | 0-2 | 0-2 | 0-2 | 0-2 | 0-2 | 0-2 | 0-2 |
| Intense Sweetener | 2-4 | 2-4 | 2-4 | 2-4 | 2-4 | 2-4 | 2-4 | 2-4 |

*gum base may include 3% to 11% by weight of a filler such as, for example talc, dicalcium phosphate, and calcium carbonate (the amount of filler in the gum base is based on the weight percent of the gum region composition, for example, in the above compositions A-H, if a gum region composition includes 5% filler, the amount of gum base will be 5% less than the range recited in the table, i.e., from 23-37%)

TABLE 2

Liquid-Fill Composition

| Component | % by Weight | | | | | | | |
|---|---|---|---|---|---|---|---|---|
| | A | B | C | D | E | F | G | H |
| Glycerin | 0 | 0-5 | 0-5 | 0-10 | 50 | 20-50 | 50 | 30-45 |
| Maltitol Syrup (Lycasin ®) | 0-80 | 0-80 | 50-70 | 55-70 | 35-50 | 40-60 | 35-55 | 30-45 |
| Non-Crystallizing Sorbitol Solution | 0-30 | 0 | 20-30 | 25-30 | 0 | 0-15 | 0 | 30-45 |
| Sodium Carboxymethyl-cellulose (CMC) | 0.1 | 0.1 | 0 | 0.1 | 0.2 | 0.1 | 0 | 0.1 |
| Xanthan Gum | 0-0.2 | 0-0.2 | 0.2 | 0-0.2 | 0 | 0.1 | 0-0.2 | 0-0.15 |
| Color | 0-0.02 | 0-0.02 | 0-0.02 | 0-0.02 | 0-0.02 | 0-0.02 | 0-0.02 | 0-0.02 |
| Flavors | 0.5-4 | 0.05-3 | 0.05-3 | 0.05-3 | 0.05-3 | 0.05-3 | 0.05-3 | 0.05-3 |
| Cooling Agent | 0.05-0.2 | 0.05-0.2 | 0.05-0.2 | 0.05-0.2 | 0.05-0.2 | 0.05-0.2 | 0.05-0.2 | 0.05-0.2 |
| Acidulants | 0-4 | 0-5 | 0-5 | 0-4 | 0-5 | 0-5 | 0-5 | 0-3 |
| Intense Sweetener | 0.01-0.03 | 0.01-0.03 | 0.01-0.03 | 0.01-0.03 | 0.01-0.03 | 0.01-0.03 | 0.01-0.03 | 0.01-0.03 |

Gum pieces including three regions: liquid fill, gum region and coating were prepared according to the compositions in Tables 1 and 2 above with each region according to the corresponding components for compositions A-H.

The compositions for the gum regions were prepared by heating the gum base to about 85° C. The gum base was then mixed with the isomalt, lecithin, glycerin and other polyols for six minutes. The isomalt employed in the gum regions had a particle size of about 37 microns and a surface area of about 0.5 m²/g. In some of the formulations, sorbitol also was included in combination with the isomalt. The sorbitol 225 microns and a surface area of about 1.12 m²/g. The flavor blends which include a pre-mix of the flavors and cooling agents were added and mixed for 1 minute. Finally, the acids and intense sweeteners were added and mixed for 5 minutes. These mixing times are approximate and the mixture can be mixed longer as necessary.

The liquid fill composition was then prepared by first preparing a pre-mix of the sodium carboxymethyl cellulose, glycerin, xanthan gum and polyols. This pre-mix was then combined with the colors, flavors, cooling agents, acids and intense sweeteners and mixed.

The gum region and liquid-fill compositions were then extruded together and formed into pieces, which were then coated, by the process described above at paragraphs. The gum pieces each had a total weight of approximately 2.2 g. In the final gum pieces, the gum region was about 50-75% by weight, the liquid-fill was about 5-15% by weight, and the coating was about 25-35% by weight.

Gum pieces that were prepared by compositions A-H demonstrated good stability and machinability. Performance data is provided in Table 3 below for three different types of center-fill chewing gum pieces prepared in accordance with compositions A-H.

TABLE 3

Formulation Performance Data

| Polyol(s) in Gum Region | Ratio | Average Particle Size (mm) | Surface Area (m²/gr) | % Polyol Syrup Added (Gum Region) | $A_w$ Gum Region (initial) | $A_w$ CF (initial) | Stability | Shrinkage | Observations |
|---|---|---|---|---|---|---|---|---|---|
| Isomalt | 1 | 37 | 0.5 | 5% | NA | 0.72 | +52 weeks (solid trend) | 10% | Good Machinability |
| Isomalt/Sorbitol | 4:1 | Isomalt (37) Sorbitol (225) | Isomalt (0.5) Sorbitol (1.12) | 4% | NA | 0.44 | Progressing well | 5% | Excellent Machinability |
| Isomalt | 1 | 37 | 0.5 | 1% | 0.18 | 0.68 | Stable at 4 weeks | — | Ok |

As seen in Table 3 above, the chewing gum pieces containing isomalt in the gum region exhibited good shelf-life stability without evidence of the center-fill composition being absorbed into the gum region. In general, the chewing gum pieces exhibited low levels of shrinkage, which provides dimensional stability, and good seal integrity in the machined gum pieces.

The invention claimed is:

1. A multi-region center-fill chewing gum composition comprising:
   (a) a first region composition, said first region composition is a center-fill and comprises an aqueous liquid; and
   (b) a second region composition adjacent to said first region composition, said second region composition comprises an elastomer and a polyol composition comprising isomalt as the only polyol;
   wherein the first region comprises maltitol syrup, wherein the first region composition has a higher water activity than the water activity of the second region composition, and wherein the second region is a chewing gum region and is free of polyols other than the isomalt.

2. The chewing gum composition of claim 1, wherein said second region composition surrounds said first region composition.

3. The chewing gum composition of claim 1, wherein said isomalt has a particle size of about 15 to about 100 microns.

4. The chewing gum composition of claim 1, wherein said isomalt has a particle size of about 15 to about 70 microns.

5. The chewing gum composition of claim 1, wherein said isomalt has a particle size of about 20 to about 50 microns.

6. The chewing gum composition of claim 1, wherein said polyol composition has a water solubility of less than 35% by weight at 30° C.

7. The chewing gum composition of claim 1, wherein said second region further comprises a second syrup comprising water and an ingredient selected from the group consisting of sugars, triacetin, lectithin, and combinations thereof.

8. The chewing gum composition of claim 7, wherein said second syrup is present in amounts of about 1% to about 15% by weight of said chewing gum composition.

9. The chewing gum composition of claim 7, wherein said polyol composition is saturated by said second syrup.

10. The chewing gum composition of claim 7, wherein the ratio of said polyol composition to said second syrup is about 15:1 to about 4:1.

11. The chewing gum composition of claim 7, wherein the ratio of said polyol composition to said second syrup is about 8:1 to about 6:1.

12. The chewing gum composition of claim 1, further comprising a coating surrounding at least a portion of said second region composition.

13. The chewing gum composition of claim 1, wherein said composition comprises a chewing gum piece weighing about 1.2 g to about 1.6 g.

14. The chewing gum composition of claim 1, wherein said composition comprises a chewing gum piece in the form of a slab.

15. The chewing gum composition of claim 1, wherein said composition comprises a chewing gum piece in the form of a pellet.

16. The chewing gum composition of claim 1, wherein said composition comprises a chewing gum piece in the form of a multi-layer slab or stick.

17. The chewing gum composition of claim 16, wherein said first region composition is positioned between two layers of said second region composition to form said multi-layer slab or stick.

18. A center-fill chewing gum composition comprising:
   (a) a center-fill composition, said center-fill composition comprising an aqueous liquid; and
   (b) a gum region composition surrounding said center-fill composition, said gum region composition comprising a gum base and a polyol composition comprising isomalt as the only polyol;
   wherein the center-fill composition comprises maltitol syrup, wherein the center-fill composition has a higher water activity than the water activity of the gum region composition, and wherein the gum region is free of polyols other than the isomalt.

19. The chewing gum composition of claim 18, wherein said isomalt has a particle size of about 20 to about 50 microns.

20. A method of preparing a multi-region chewing gum composition, comprising the steps of:
   (a) extruding a multi-region composition comprising
      (i) a first region composition is a center-fill and, said first region composition comprises an aqueous liquid, and
      (ii) a second region composition which is a chewing gum region and is adjacent to said first region composition, said second region composition comprises:

(1) an elastomer; and
(2) a polyol composition comprising isomalt as the only polyol;
(b) sizing said multi-region composition;
(c) feeding said multi-region composition into a forming mechanism;
(d) forming individual pieces of said multi-region composition; and
(e) coating said individual pieces with a coating; wherein the first region composition comprises maltitol syrup, wherein the first region composition has a higher water activity than the water activity of the second region composition, and wherein the second region is free of polyols other than the isomalt.

21. The method of claim 20, further comprising the step of cooling said multi-region composition of step (b) prior to feeding said multi-region composition into the forming mechanism.

22. The method of claim 20, further comprising the step of cooling said individual pieces of said multi-region composition of step (d) prior to coating said individual pieces with a coating.

* * * * *